(12) United States Patent
Brown

(10) Patent No.: US 8,282,307 B1
(45) Date of Patent: Oct. 9, 2012

(54) FURNITURE JOINERY

(75) Inventor: Michael T. Brown, Shelbyville, KY (US)

(73) Assignee: Audubon Block Company, Shelbyville, KY (US)

( * ) Notice: Subject to any disclaimer, the term of this patent is extended or adjusted under 35 U.S.C. 154(b) by 99 days.

(21) Appl. No.: 12/704,988

(22) Filed: Feb. 12, 2010

Related U.S. Application Data

(63) Continuation-in-part of application No. 11/697,329, filed on Apr. 6, 2007, now Pat. No. 7,677,830.

(51) Int. Cl.
*F16B 1/00* (2006.01)
*F16B 9/00* (2006.01)
*F16L 41/00* (2006.01)

(52) U.S. Cl. ............... 403/205; 297/440.1; 297/440.22; 403/231; 403/381

(58) Field of Classification Search .................. 403/170, 403/205, 217, 219, 230, 231, 253, 256, 381, 403/382, 401, 402, 403; 297/440.1, 440.22; 248/188, 188.91; 312/140, 263, 264
See application file for complete search history.

(56) References Cited

U.S. PATENT DOCUMENTS

| | | | |
|---|---|---|---|
| 110,013 A | 12/1870 | Cougle | |
| 136,837 A | 3/1873 | Jefts | |
| 194,903 A | 9/1877 | Hass | |
| 242,513 A | 6/1881 | Crane | |
| 422,843 A | 3/1890 | Smith | |
| 456,377 A | 7/1891 | Goedeke | |
| 473,151 A | 4/1892 | Good et al. | |
| 478,857 A | 7/1892 | Harman et al. | |
| 480,536 A * | 8/1892 | Welker | 248/188 |
| 495,857 A | 4/1893 | Volz | |
| 509,618 A | 11/1893 | Goodyear | |
| 512,992 A | 1/1894 | Ritchey | |
| 533,766 A | 2/1895 | Williams | |
| 545,538 A | 9/1895 | Sellers | |
| 556,869 A | 3/1896 | Sigler | |
| 562,133 A | 6/1896 | Grassler | |
| 577,229 A | 2/1897 | Bosch | |
| 626,554 A | 6/1899 | McLean | |
| 636,434 A | 11/1899 | Kendall | |
| 637,506 A | 11/1899 | Fries | |
| 677,726 A | 7/1901 | Welker, Sr. | |
| 766,695 A * | 8/1904 | Herzog | 248/188 |
| 836,585 A | 11/1906 | Koeser | |
| 1,181,156 A | 5/1916 | Neal | |
| 1,184,297 A * | 5/1916 | Balbach | 248/188 |
| 1,214,261 A | 1/1917 | Balbach | |
| 1,246,714 A | 11/1917 | Carlson | |
| 1,306,452 A | 6/1919 | White | |
| 1,338,202 A | 4/1920 | White | |
| 1,389,008 A | 8/1921 | Pohle, Jr. | |

(Continued)

FOREIGN PATENT DOCUMENTS

EP 0671566 A1 9/1995

(Continued)

*Primary Examiner* — Daniel P. Stodola
*Assistant Examiner* — Jonathan Masinick
(74) *Attorney, Agent, or Firm* — Middleton Reutlinger; James E. Cole

(57) ABSTRACT

A furniture joinery, comprises a slide rail and a slide block. The slide block includes a cut extending therethrough. The slide block receives a fastener and when the fastener passes through the cut, slides on the slide block become misaligned in the slide rail thus retaining the slide block therein.

19 Claims, 23 Drawing Sheets

U.S. PATENT DOCUMENTS

| Patent No. | | Date | Name | Ref |
|---|---|---|---|---|
| 1,442,770 | A | 7/1922 | Kropf | |
| 1,480,905 | A | 1/1924 | Herbert | |
| 1,525,630 | A | 2/1925 | Wendl | |
| 1,526,009 | A | 2/1925 | Partington | |
| 1,558,618 | A | 10/1925 | Jasper | |
| 1,630,521 | A | 5/1927 | Bolin | |
| 1,644,336 | A | 10/1927 | Gunlocke et al. | |
| 1,770,722 | A | 7/1930 | Wright | |
| 1,778,135 | A | 10/1930 | Williams | |
| 1,787,598 | A | 1/1931 | Smith | |
| 1,834,313 | A | 12/1931 | Kaufman | |
| 1,843,369 | A * | 2/1932 | Olsen | 144/347 |
| 1,863,995 | A | 6/1932 | Ponstingl | |
| 1,876,336 | A | 9/1932 | McLaughlin | |
| 1,942,003 | A | 1/1934 | Rundle | |
| 1,989,955 | A | 2/1935 | Van Patter | |
| 2,077,067 | A * | 4/1937 | McLellan et al. | 403/219 |
| 2,116,584 | A | 5/1938 | Shelby | |
| 2,143,542 | A | 1/1939 | Clarin | |
| 2,169,139 | A | 8/1939 | Foote | |
| 2,304,481 | A | 12/1942 | Shannon | |
| 2,371,329 | A * | 3/1945 | Hirsch | 403/217 |
| 2,395,673 | A | 2/1946 | Krantz | |
| 2,485,784 | A | 10/1949 | Shoenberg | |
| 2,503,227 | A * | 4/1950 | Vining | 12/117.4 |
| 2,520,231 | A * | 8/1950 | Anderson | 403/231 |
| 2,522,827 | A | 9/1950 | Kelly | |
| 2,552,286 | A | 5/1951 | Kompass | |
| 2,580,707 | A | 1/1952 | Underhill | |
| 2,588,818 | A | 3/1952 | Franks | |
| 2,603,545 | A | 7/1952 | Haven | |
| 2,651,355 | A * | 9/1953 | Lucas | 297/446.1 |
| 2,709,485 | A | 5/1955 | Haven | |
| 2,970,025 | A | 1/1961 | Wilson | |
| 3,090,086 | A | 5/1963 | Fata | |
| 3,204,905 | A | 9/1965 | Marban | |
| 3,399,912 | A | 9/1968 | Maspero | |
| 3,529,697 | A * | 9/1970 | White et al. | 182/186.2 |
| 3,664,011 | A | 5/1972 | Labastrou | |
| 3,669,479 | A | 6/1972 | Payne | |
| 3,674,068 | A | 7/1972 | Lucci | |
| 3,899,258 | A | 8/1975 | Matthews | |
| 3,957,239 | A | 5/1976 | Slaats et al. | |
| 3,991,535 | A | 11/1976 | Keller et al. | |
| 4,032,242 | A * | 6/1977 | Morris | 403/231 |
| 4,057,356 | A | 11/1977 | Nissen | |
| 4,072,433 | A | 2/1978 | Veyhl | |
| 4,138,094 | A * | 2/1979 | Thir | 256/67 |
| 4,161,977 | A | 7/1979 | Baslow | |
| 4,168,922 | A * | 9/1979 | Worrallo | 403/231 |
| 4,300,455 | A | 11/1981 | Ornati | |
| 4,396,173 | A | 8/1983 | Call, Sr. | |
| 4,432,590 | A * | 2/1984 | Lawrence et al. | 312/265.4 |
| 4,586,310 | A | 5/1986 | Baril et al. | |
| 4,691,965 | A * | 9/1987 | Hsiung | 297/440.18 |
| 4,766,821 | A | 8/1988 | Pauer et al. | |
| 4,901,383 | A * | 2/1990 | Yang et al. | 5/201 |
| 4,918,871 | A | 4/1990 | Widmann | |
| 4,973,187 | A | 11/1990 | Sauder | |
| 5,042,615 | A * | 8/1991 | Anderson | 182/136 |
| 5,116,161 | A | 5/1992 | Faisst | |
| 5,425,520 | A | 6/1995 | Masumoto | 248/247 |
| 5,499,886 | A | 3/1996 | Short et al. | |
| 5,577,451 | A | 11/1996 | Yeh | |
| 5,621,994 | A * | 4/1997 | Cobb et al. | 40/782 |
| 5,623,803 | A * | 4/1997 | Willis | 52/650.3 |
| 5,746,325 | A | 5/1998 | Lee | |
| 5,803,561 | A | 9/1998 | Puehlhorn | |
| 5,820,089 | A | 10/1998 | Lim | |
| 6,017,092 | A | 1/2000 | Lee | |
| 6,058,991 | A * | 5/2000 | Hill | 144/350 |
| 6,125,604 | A * | 10/2000 | Holmes | 52/713 |
| 6,179,515 | B1 | 1/2001 | Grieser et al. | |
| 6,379,074 | B1 * | 4/2002 | Chin et al. | 403/231 |
| 6,397,551 | B1 | 6/2002 | Lewcock et al. | |
| 6,413,007 | B1 | 7/2002 | Lambright | |
| 6,481,177 | B1 | 11/2002 | Wood | |
| 6,579,033 | B2 * | 6/2003 | Ajiki | 403/403 |
| 6,691,537 | B2 | 2/2004 | Tan | |
| 7,559,180 | B2 * | 7/2009 | Ajiki | 52/655.1 |
| 7,707,795 | B2 * | 5/2010 | Yu et al. | 52/657 |
| 2002/0006312 | A1 * | 1/2002 | Buard | 403/403 |
| 2002/0037195 | A1 * | 3/2002 | Ajiki | 403/403 |
| 2004/0101358 | A1 * | 5/2004 | Odorico et al. | 403/403 |
| 2006/0162277 | A1 | 7/2006 | Schultz | |

FOREIGN PATENT DOCUMENTS

| | | |
|---|---|---|
| EP | 1081393 A1 | 3/2001 |
| FR | 2515014 A1 | 4/1983 |
| SE | 35656 | 8/1912 |

* cited by examiner

FURNITURE JOINERY

CROSS REFERENCES TO RELATED APPLICATIONS

The present non-provisional application claims priority to, currently pending, U.S. Non-Provisional application Ser. No. 11/697,329, filed Apr. 6, 2007.

STATEMENT REGARDING FEDERALLY SPONSORED RESEARCH OR DEVELOPMENT

None.

REFERENCE TO SEQUENTIAL LISTING, ETC

None.

BACKGROUND

1. Field of the Invention

The present invention relates to furniture joinery and more particularly to slide rail and slide block constructions for joining furniture components.

2. Description of the Related Art

Furniture joinery is a term which generally refers to one or more elements structures used to join two or more components of a piece of furniture. As furniture manufacturing has evolved, the desire for knock-down furniture which may be manufactured in one location and shipped for assembly to another location has increased. Prior art joinery, sometimes utilizes dovetail construction which has various deficiencies. First, the dovetails are difficult to manufacture which results in higher costs being passed to the consumer. The dovetail design also has a weakened area where the dovetail extends from the workpiece. Such area is typically referred to as a neck and receives the majority of the stress created at the joint. Other prior art joinery may utilize a metal brace to join parts. However, these metal to wood connections must have multiple screws to create a lasting rigid joint. Further, chair rails and table aprons often require multiple screws or bolts at each corner of a furniture piece and/or clamps to insure furniture components are tight while glue dries. For example one screw may pass through a joinery element into a leg while other screws may extend into adjacent apron structures in order to tie all of the pieces together rigidly. The use of multiple fasteners or clamping mechanisms results in higher manufacturing costs and increased parts and labor to accomplish a desired task.

Another problem with some knock-down furniture designs is related to shipping. It is desirable to utilizing the least amount of volume in shipping. Where some designs for furniture joinery have required larger portions of a furniture piece to be assembled prior to shipping, the larger partial assemblies result in higher shipping costs where larger assemblies can not be nested within other structures being shipped. It is desirable that a furniture joinery be developed which decreases the number of fasteners required for ease of assembly and which also may be easily shipped from a collapsed configuration minimizing volume from a manufacturing facility to an assembly facility or a consumer.

Given the foregoing, it will be appreciated that a joinery assembly is desired which may be used with various types of furniture pieces and which allows for easy assembly of such pieces.

SUMMARY OF THE INVENTION

A furniture joinery comprises a slide rail having a plurality of grooves, at least one slide block slidably disposed in the slide rail, the slide block having a plurality of slides for engaging the slide rail, at least one of the plurality of slides having a neck and a head, the grooves receiving the neck therein. The slide block has three slides. The upper and lower slides each have the neck and the head. The slide rails further comprising an undercut channel disposed beneath at least one of said plurality of slides. The undercut channels are disposed beneath two of the grooves. The undercut channel receives the head. The plurality of slides have a substantially T-shaped cross-section. The plurality of grooves and undercut channels in combination forming a substantially T-shaped cross-section. The furniture joinery further comprises at least one fastener aperture extending through the slide block. A first fastener aperture extends through the slide block and a second fastener aperture extending through the slide block in an orientation substantially perpendicular to the first fastener aperture.

A furniture joinery for a furniture piece comprises a first pair of legs and a second pair of legs, a first slide rail disposed between the first pair of legs, a second slide rail disposed between the second pair of legs, first and second side slides rails, each of said side slide rails disposed between one of said first pair of legs and one of said second pair of legs, the slide rails each having a plurality of grooves for receiving a slide block, the slide rails having a plurality of grooves, at least one of the grooves having an undercut channel defining a substantially T-shaped cross section in said slide rail, the slide block having slides which slidably engage the slide rails, the slides having a substantially T-shaped cross section. At least one of the slide rails further comprising a slot extending substantially perpendicular to the plurality of grooves. The slot extending through at least one of the upper and lower surfaces of the slide rail. The furniture joinery further comprises an insert disposed within the slot, the slide block engaging the insert. The furniture slide block has at least one fastening aperture for connecting the slide block to one of the first pair and second pair of legs. The furniture joinery the slide block may have an aperture for connecting a structural element above the slide block. The furniture joinery the grooves of at least one of the slide rails extending from a first end to a second end of at least one of the first and second side slide rails. The grooves of at least one of the slide rails having a widened central portion for receiving the slide block.

A furniture joinery assembly comprises a slide rail having a plurality of grooves, at least one slide block slidably disposed in the slide rail, the slide block having a plurality of slides for engaging the slide rail, at least one of the plurality of slides having a neck and a head, the grooves receiving the neck therein, and, a slot extending perpendicular to the plurality of grooves near ends of the slide rail. The plurality of grooves extend from a first end to a second end of the slide rail. The grooves further comprise an undercut channel. The grooves and the undercut channel define a substantially T-shaped cross-section. The furniture joinery further comprises an insert disposed in the slot. The furniture joinery further comprises two slide rails and one slide block at each corner of a furniture piece wherein the slide block engages the insert.

A furniture joinery, comprises a slide rail having a longitudinal axis and a plurality of grooves extending substantially parallel to the longitudinal axis, at least one substantially trapezoidal-shaped slide block having a short surface and a long surface parallel to the short surface, the slide block slidably disposed in the slide rail for movement substantially along the longitudinal axis, the slide block having a plurality of slides engaging the plurality of grooves of the slide rail, at least one of the plurality of slides having a substantially T-shaped cross-section, the slides having a leading surface extending from the short surface at the angle to the longitudinal axis and, the substantially T-shaped cross-section having a neck and a head, the grooves receiving the neck therein and the head inhibiting removal of the slide block by a force perpendicular to a slide motion along the slide rail, at least one fastener aperture passing through the slide block from the long surface toward the short surface, the slide block having a cut extending through the block, the cut partially separating a first portion of the block from a second portion, the at least one fastener passing from the first portion to the second portion and causing pivoting between beneath the cut and frictional engagement of the slides with the grooves of the slide rail. The furniture joinery wherein the fastener has a first position and a second position and further wherein one of the first and second positions the fastener engages the first portion and the second portion. The furniture joinery wherein the one of the first position and second position causes misalignment of the slides. The furniture joinery wherein the cut extends between an upper surface of the slide block and a lower surface of the slide block. The furniture joinery wherein the cut is substantially vertical. The furniture joinery wherein the cut is angled. The furniture joinery wherein the cut extends between a lower surface of the slide block and an upper surface of the slide block. The furniture joinery wherein the fastener displaces the slides on one side of the cut.

A furniture joinery, comprises a slide block having a substantially trapezoidal shape including an upper surface, a lower surface, a short side and a long side each extending between the upper and lower surfaces, the short side and the long side being substantially parallel, and two angled side surfaces extending between the short side and the long side, at least one slide disposed along each of the side surfaces at least one cut passing through the slide block and defining a first portion of the slide block and a second portion of the slide block, a fastener extending through one portion of the first portion and the second portion of the slide block to the other of the first portion and the second portion of the slide block, the fastener causing pivoting of one of the first and second portions of the slide block, the slides having a first aligned position and a second misaligned position, the misaligned position caused by a fastener extending through the slide block and engaging an adjacent furniture element. The furniture joinery wherein the slide block has a fastener aperture on the long side. The furniture joinery wherein the fastener aperture extends through the first and second portions of the slide block. The furniture joinery of wherein the at least one cut is substantially vertically oriented. The furniture joinery wherein the at least one cut being at an angle to a vertical axis. The furniture joinery wherein at least one cut extends from the top surface toward the bottom surface. The furniture joinery wherein the at least one cut extends from the bottom surface toward the top surface.

A furniture joinery comprises a slide block having a first angled side surface and a second angled side surface, a top surface and a bottom surface extending between said first and second angled sides, and a plurality of slides extending along said first and second angled side surfaces, a cut extending partially through the slide block and defining a first portion and a second portion, the material adjacent the cut defining a pivot, a fastener aperture extending through the slide block and from the first portion to the second portion, a fastener extending through the fastener aperture and engaging an adjacent element of a furniture piece, the fastener causing pivoting at the pivot and further causing misalignment of the plurality of slides between the first portion and the second portion of the slide block. The furniture joinery further comprising a corner element which may be disposed between the slide block and a plurality of rails. The furniture joinery wherein the corner element further comprises a plurality of slides on a first angled surface and a second angled surface. The furniture joinery wherein the slides have a cross-sectional shape requiring an undercut groove on an adjacent rail.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

Figure 1:
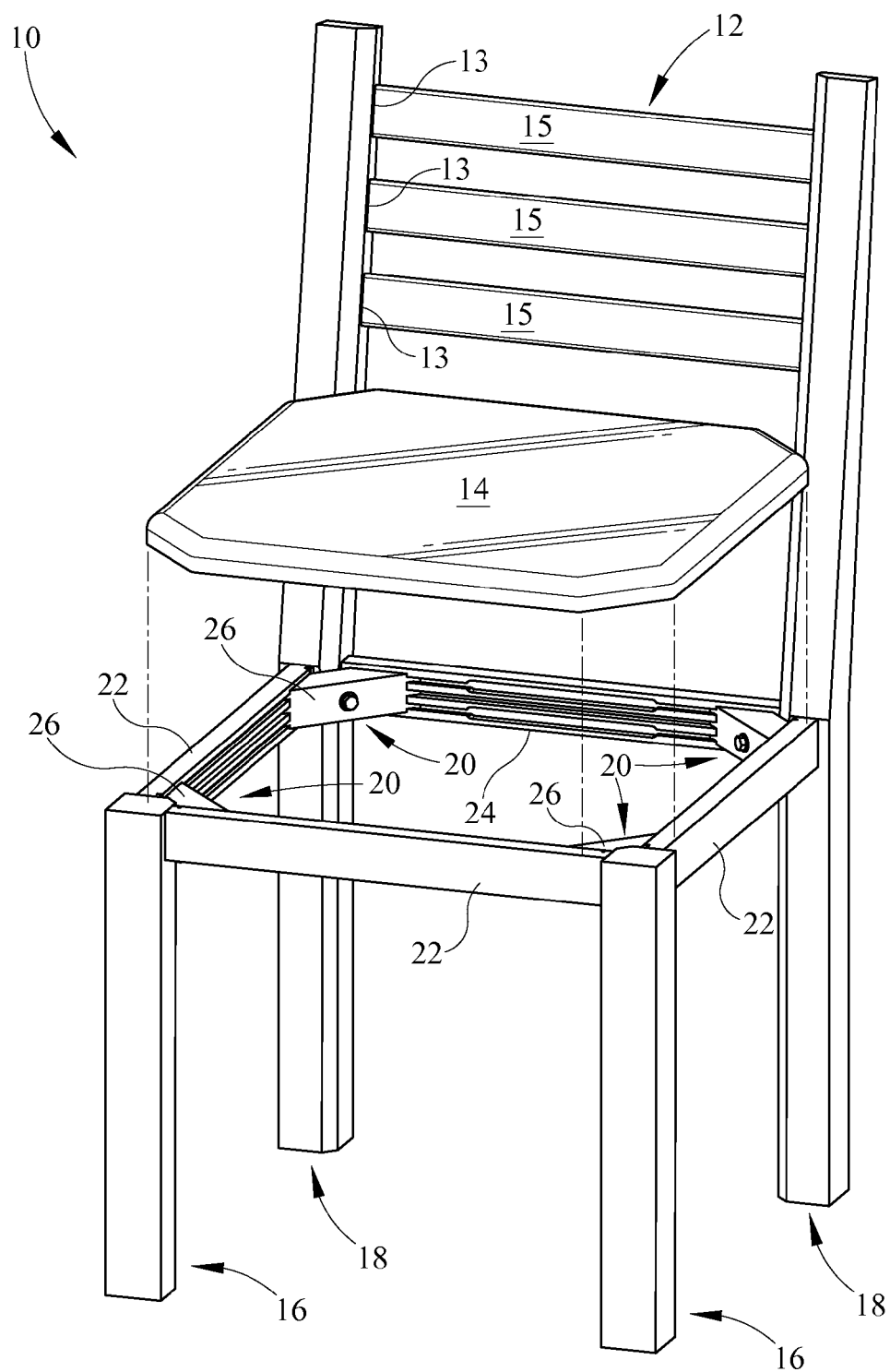
FIG. 1 depicts a partially exploded perspective view of a chair utilizing furniture joinery.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring initially to FIG. 1, a chair 10 is depicted. The chair 10 is merely an exemplary embodiment and therefore the scope of the present description should not be unnecessarily limited to the specific chair 10 design depicted herein. The chair 10 comprises a chair back 12 extending upwardly behind a seat portion 14 such that the seat 14 supports the weight of the user and the chair back 12 supports the back of the user. The seat 14 is supported by a plurality of legs. According to the exemplary embodiment, the chair 10 comprises two front legs 16 and two rear legs 18. The front legs 16 extend from a substrate to the lower surface of the seat 14 providing support for the seat 14. The rear legs 18 extend upwardly from the substrate to above the seat 14 in order to define a portion of the chair back 12. The legs 16, 18 are held together by joinery 20, defined by a plurality of grooved slide rails 22 extending between the front legs 16 and the rear legs 18 and between the front legs 16. The joinery 20 is also defined by a rear slide rail 24 extending between the two rear legs 18. The joinery 20 is also defined in part by a slide block 26. As the slide block 26 is tightened into position, the legs 16, 18 and the grooved rails 22 tighten together providing a firm base for the seat 14 and the chair 10 as well as a strong triangular support shape joining furniture components. It should be understood that the chair 10 may further comprise structural components extending between the legs 16, 18 parallel to the rails 22, 24 but in a position closer to the floor for added structural support.

Figure 2:
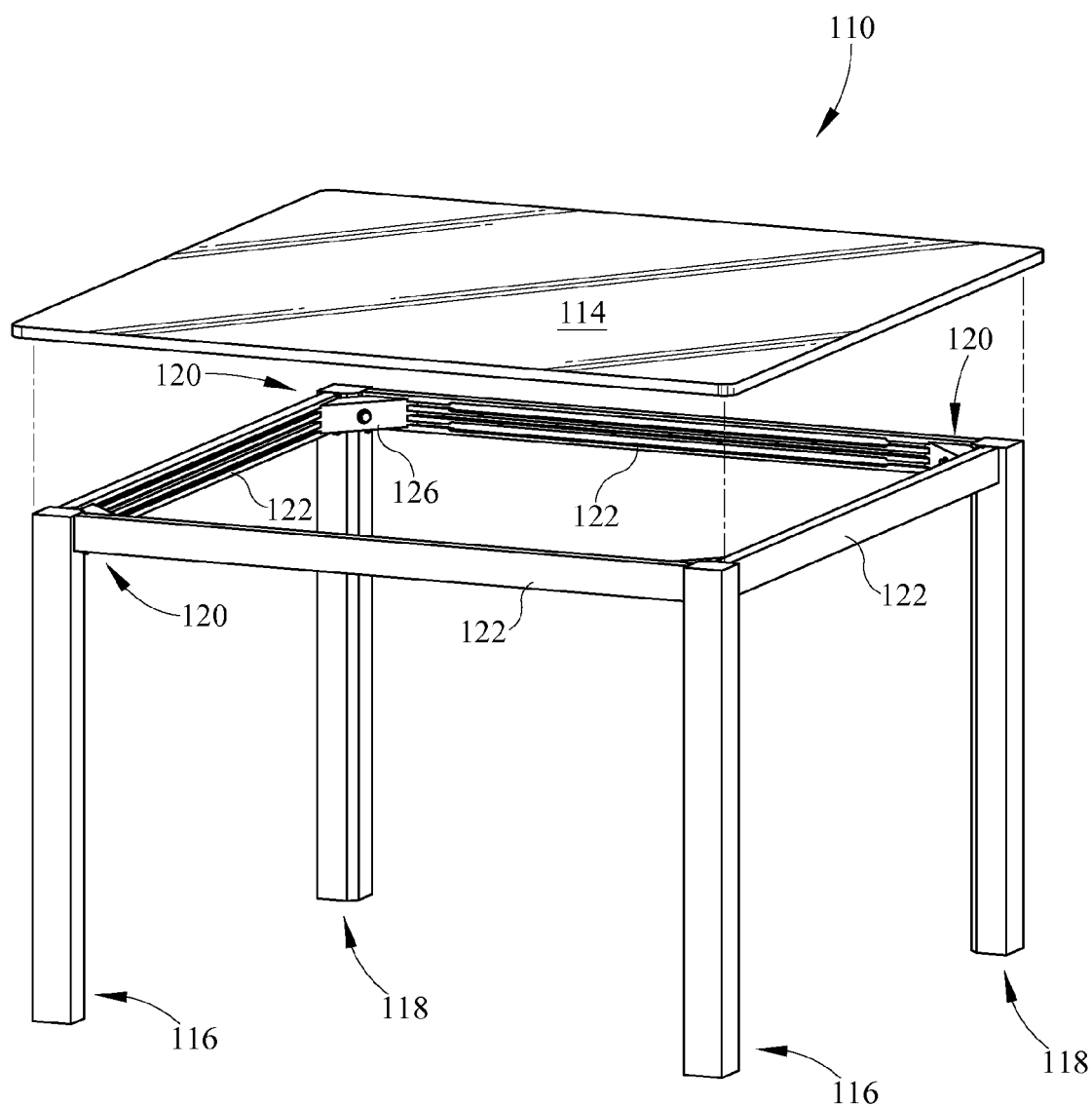
FIG. 2 depicts a partially exploded perspective view of a table utilizing furniture joinery.

Referring to FIG. 2, an alternative embodiment is depicted utilizing joinery 120. A table 110 is depicted having an upper surface 114. The table surface 114 is supported by first and second front legs 116 and first and second rear legs 118 which are connected by a plurality of table aprons 122 corresponding to the grooved slide rails 22. The joinery 120 is defined by the table aprons 122 and a plurality of slide blocks 126, which join the aprons 122 and the legs 116, 118. It should be understood by one skilled in the art that the joinery 120, therefore, should not be limited to a chair construction but may also be utilized in a table or various other furniture structures requiring joining of structural components. Accordingly, the description herein should not be limited to the specific uses specifically shown and described, but instead should be considered more broadly for use in joining various furniture components.

Figure 3:
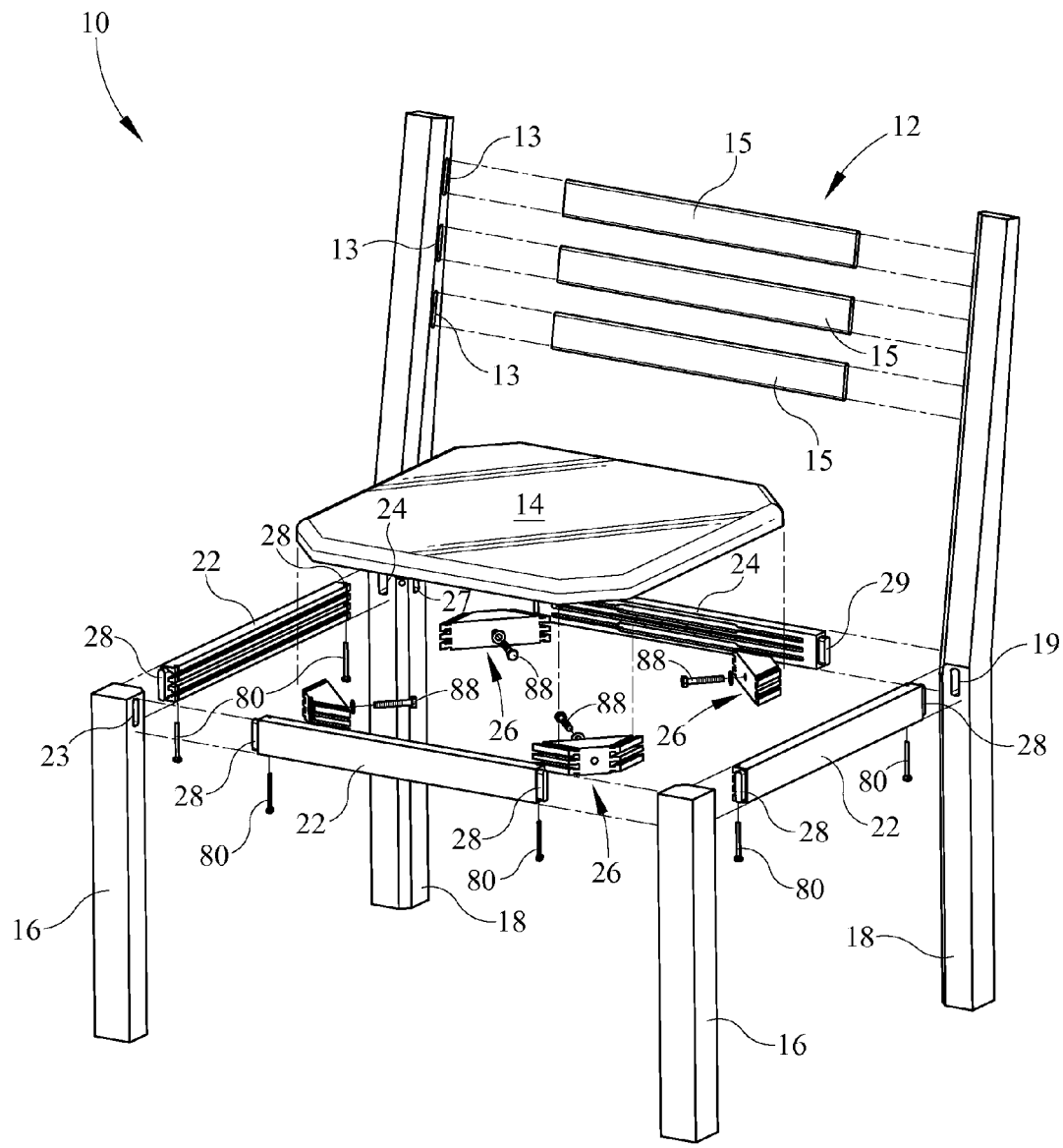
FIG. 3 depicts an exploded perspective view of the chair of FIG. 1.

Referring now to FIG. 3, the chair 10 of the FIG. 1 embodiment is depicted in an exploded perspective view. The chair back 12 is formed of the rear legs 18 which extend above the seat 14. The upper portions of the rear legs 18 comprise a plurality of aligned apertures 13. The apertures 13 receive a corresponding number of slats 15 aligned to fit within the apertures 13 and extend between the rear legs 18. Alternatively, the chair back 12 may include a plurality of alternative structures such as a one-piece construction extending from the seat 14, or which extend between or are connected to the rear legs 18 so as to provide a support for a person sitting in the chair 10. For example, the chair back 12 may include padding and may be covered in a fabric or the chair back 12 may include a weaved material, such as wicker or the like, extending between the upper portions of the rear legs 18. Therefore, the chair back 12 should not be limited to the specific construction depicted and described herein.

The front legs 16 each have a surface facing an opposed surface of the rear leg 18. Extending between the front legs 16 and rear legs 18 are side grooved slide rails 22. The opposed surface of the front leg 16 (not shown) and the rear leg 18 each include a keyway 24 which receives a key 28, which alternatively may be a mortise and tenon, dowel and aperture or other male-female assembly of interconnecting parts known to one skilled in the art. During construction, the key 28 is inserted into the keyway 24 to loosely connect the grooved rails 22, the front legs 16, and the rear leg 18. A manufacturer may utilize glue on the key 28/keyway 19 to aid construction, if so desired.

Extending between the pair of front legs 16 is a third grooved rail 22. Each of the front legs 16 includes an opposed surface having an aperture 23 for receiving the key 28 of the grooved rail 22. Thus, the front grooved rail 22 connects the pair of front legs 16 loosely. Referring now to the rear legs 18, each of the rear legs 18 includes an opposed surface having an aperture 27. A rear grooved rail 24 extends between the parallel rear legs 18 such that the keyways 27 receive keys 29 extending from ends of the rear slide rail 24. As previously described, the key/keyway combination may alternatively be a mortise and tenon, dowel and aperture or other male-female assembly of interconnecting parts known to one skilled in the art. According to one alternative, the grooved rear slide rail 24 may be formed integrally with a seat back structure 12, or with the seat 14. With this description, one skilled in the art will understand that the front legs 16 are connected by a rail 22, the rear legs 18 are connected by a rail 24 and the front and rear legs are connected on each side of the chair 10 by the grooved rails 22. This construction provides stability in four directions, front to back, between the front legs 16 and rear legs 18 and side to side between the front pair of legs 16 and between the rear pair of legs 18.

The joinery 20 further comprises slide blocks 26 as previously described, which connect the grooved rails 22 to one another, to the rail 24, and which may be tightened against the front legs 16 and the rear legs 18 at each corner of the chair 10. Although the joinery 20 described herein is described with respect to the chair 10, it should be clear that the description should not be limited to such a chair but may also be utilized with the table 110 or other pieces of furniture having joined sides or legs which could benefit from the construction of the joinery and equivalent structures.

Figure 4:
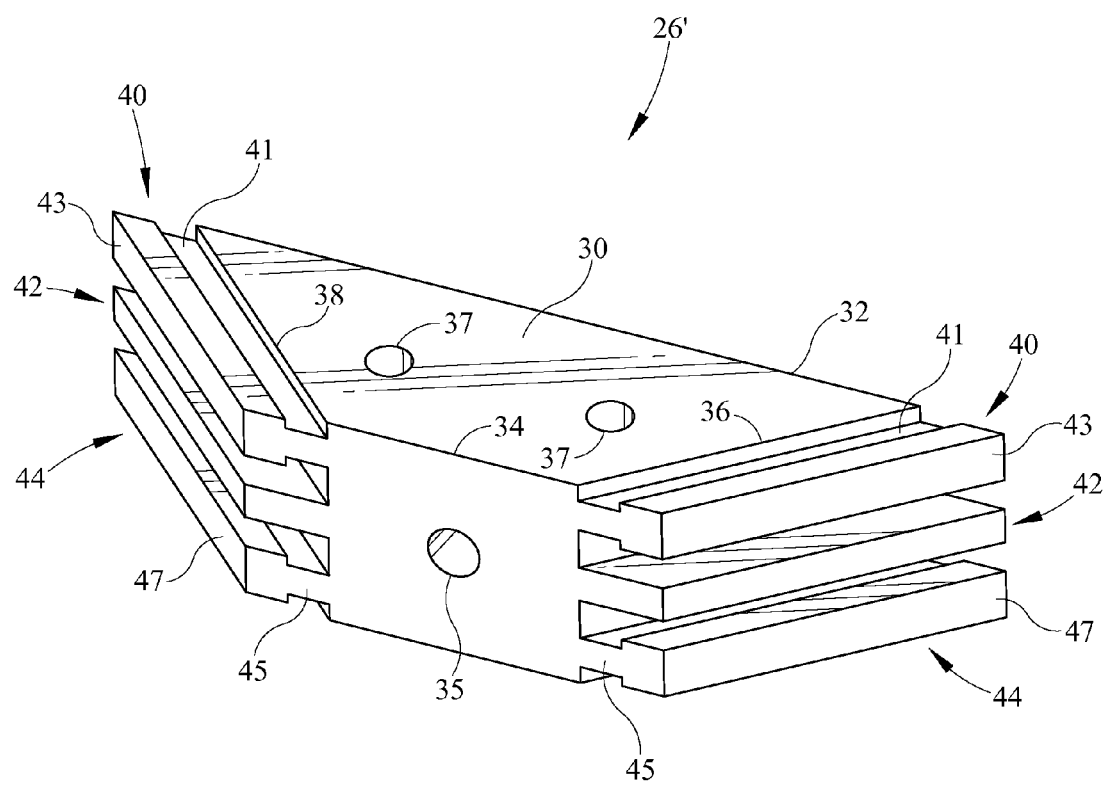
FIG. 4 depicts a perspective view of a slide block.

Referring now to FIG. 4, a slide block 26 is depicted in perspective view. The slide block 26 is generally shaped as a frusto-triangularly shaped trapezoid. The block 26 may be alternately shaped however, and therefore should not be limited to the trapezoidal shape shown. The slide block 26 comprises a body 30, having first and second parallel sides 32, 34. The shorter parallel side 34 is positioned against the legs 16, 18. Extending through the body 30 from the short side 34 to long side 32 is fastener aperture 35. Likewise, the body 30 may also comprise one or more vertically oriented apertures 37 for fastening the block 26 to the seat 14 or a table top. Extending along the non-parallel sides 36, 38 of the body 30 are a plurality of slides. For example, along side 36 of the body 30 is an upper slide 40, a middle slide 42 and a lower slide 44. Likewise, along the angled side 38 is an upper slide 40, middle slide 42 and a lower slide 44. By utilizing three slides, any force carried at a joint is spread across three parts, rather than a single weak point of a dovetail joint. The upper slides 40 comprise an upper neck 41 and an upper head 43 at an end of the upper neck 41 distal from the side 36. The head 43 is generally square in shape and extends along the entire length of the upper neck 41. Likewise, the lower slide 44 comprises a lower neck 45 and a lower head 47 distal from the side 36. Also extending from the side 36 and disposed between the upper slide 40 and lower slide 44 is a middle slide 42. The middle slide 42 does not comprise a distal rib as the upper and lower fingers, however a middle rib may be utilized and therefore should be understood to be within the scope of the present invention. The side 38 comprises the same upper, lower and middle slides in the same orientation as previously described. The sides 36, 38 are angled at about 45 degrees to the long side 32 of the body 30. However, these angles may vary depending on the arrangement of the components being joined by the rails 22.

Figure 5:
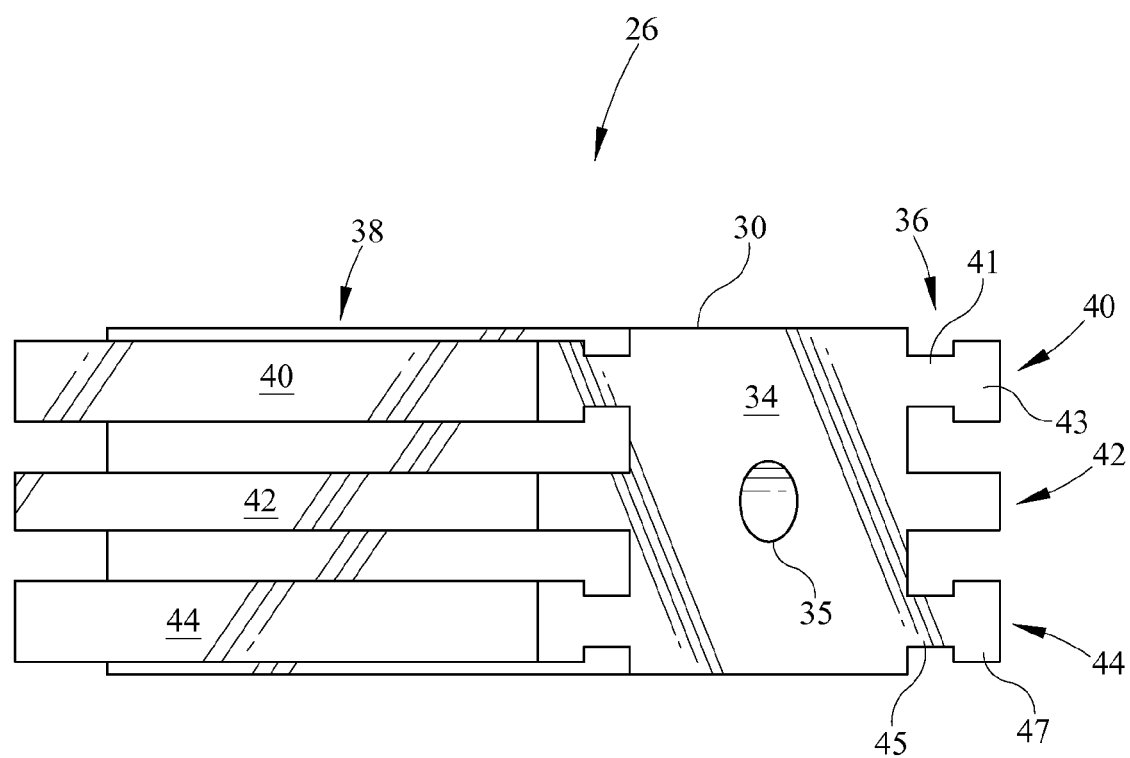
FIG. 5 depicts a side view of the slide block of FIG. 4.

Referring now to FIG. 5, a side perspective view of the slide block 26 is depicts an end view of side 36 and the slides associated therewith. The upper slide 40 comprises a neck 41 having a thickness in a vertical dimension which is less than the thickness of the head 43 in the vertical dimension. Accordingly, the upper slide 40 is generally T-shaped when viewed from the end shown in FIG. 5. Likewise, the lower slide 44 comprises a neck 45 having a thickness in a vertical dimension which is less than the thickness in the vertical dimension of the head 47. Accordingly, the finger 44 is generally T-shaped and extends parallel to the upper slide 40. The middle slide 42 has a thickness in a vertical dimension which is generally equivalent to the upper and lower necks 41, 45. The necks and heads of the upper and lower slides 40, 44 may be integrally formed or may be separately formed and joined by fastener, fixative or both. The middle slide 42 fails to comprise a head as the upper slide 40 and lower slide 44, although a head may be utilized and may be within the scope of the present invention. The upper slide 40 has a horizontal dimension which is equivalent to the lower slide 44 and the middle slide 42. Accordingly, each of the slides extends an equivalent distance from the side 36. These characteristics are repeated in the slides extending from side 38 and therefore will not be described.

Figure 6:
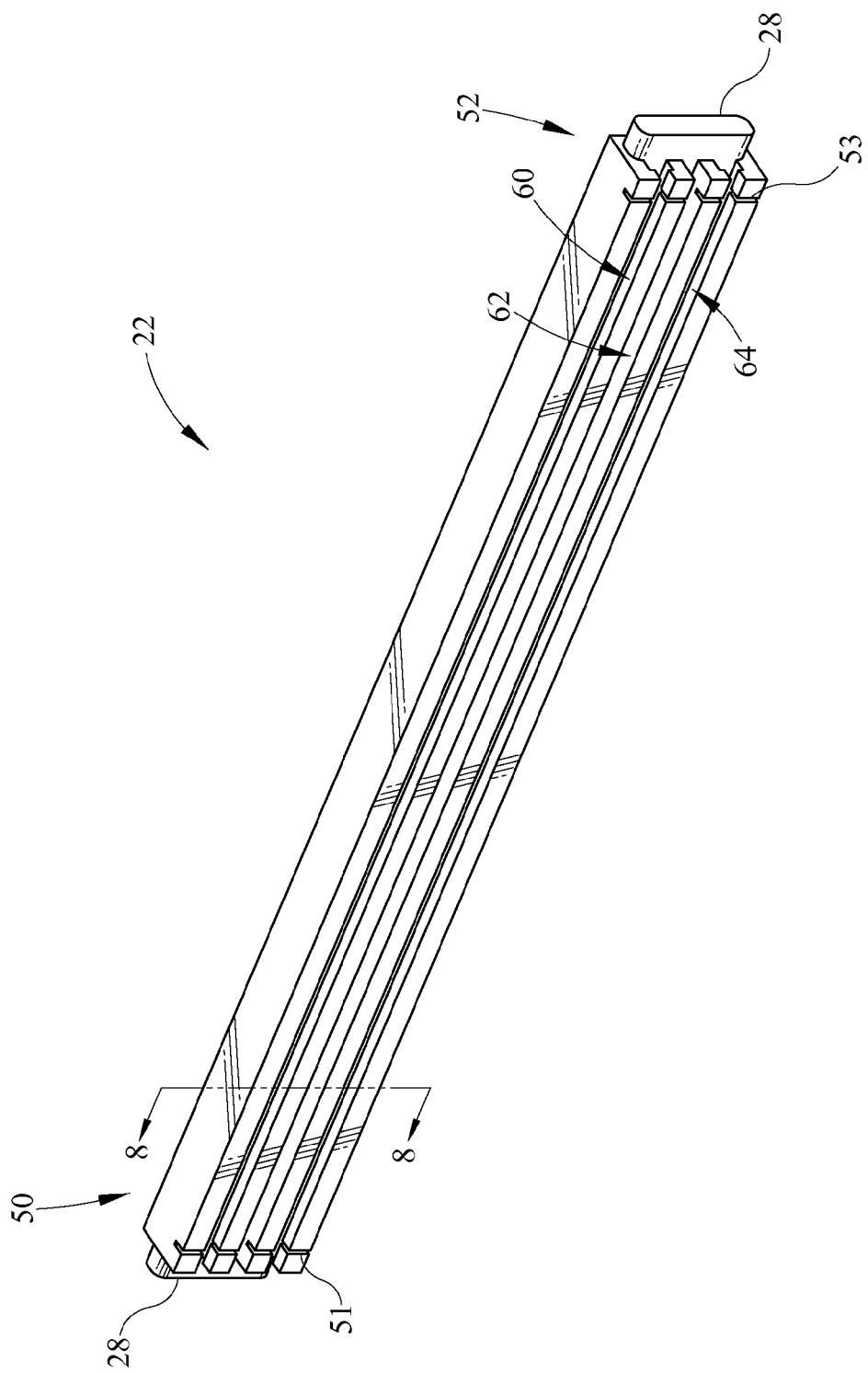
FIG. 6 depicts a perspective view of a slide rail.
Figure 8:
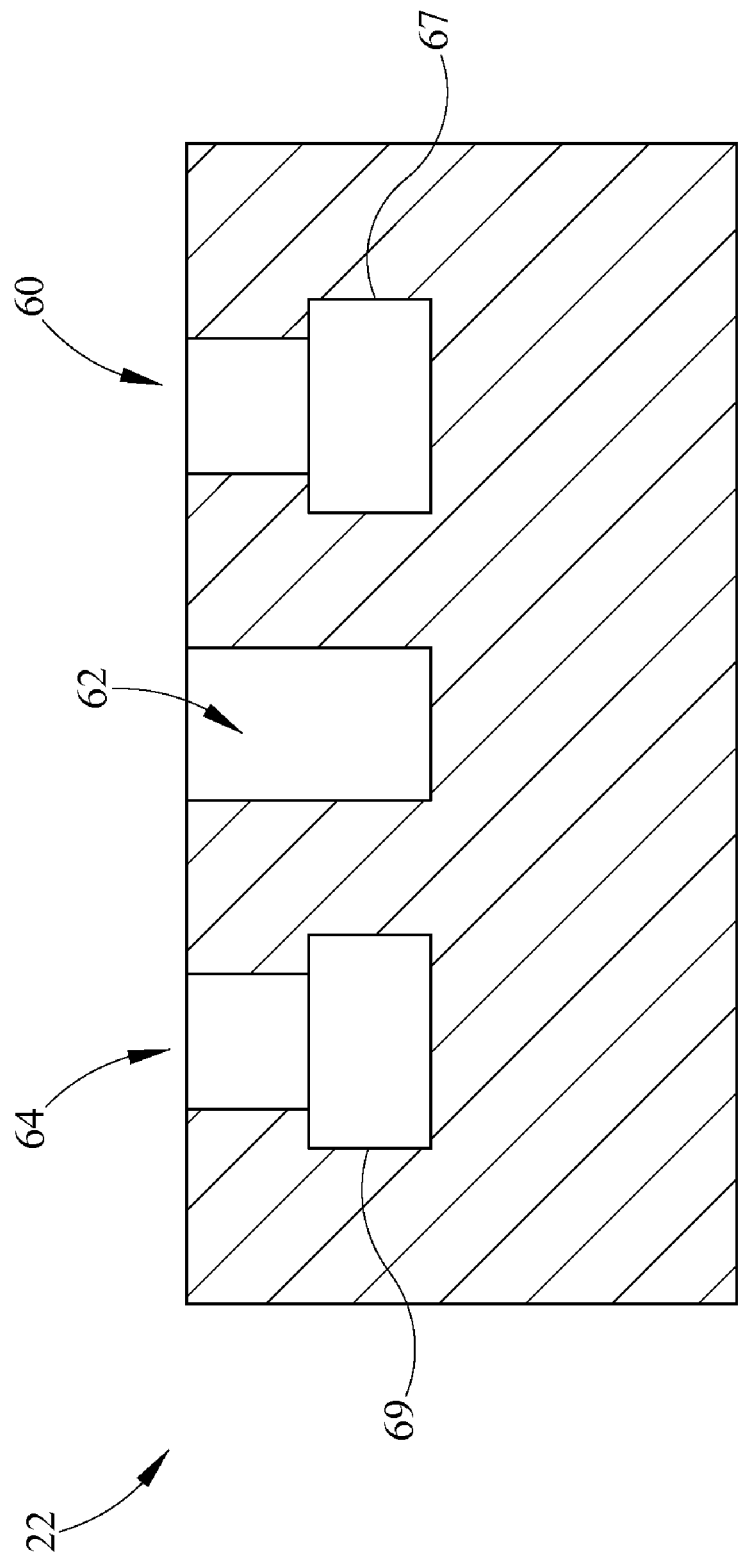
FIG. 8 depicts a side-sectional view of the rail of FIG. 6.
Figure 9:
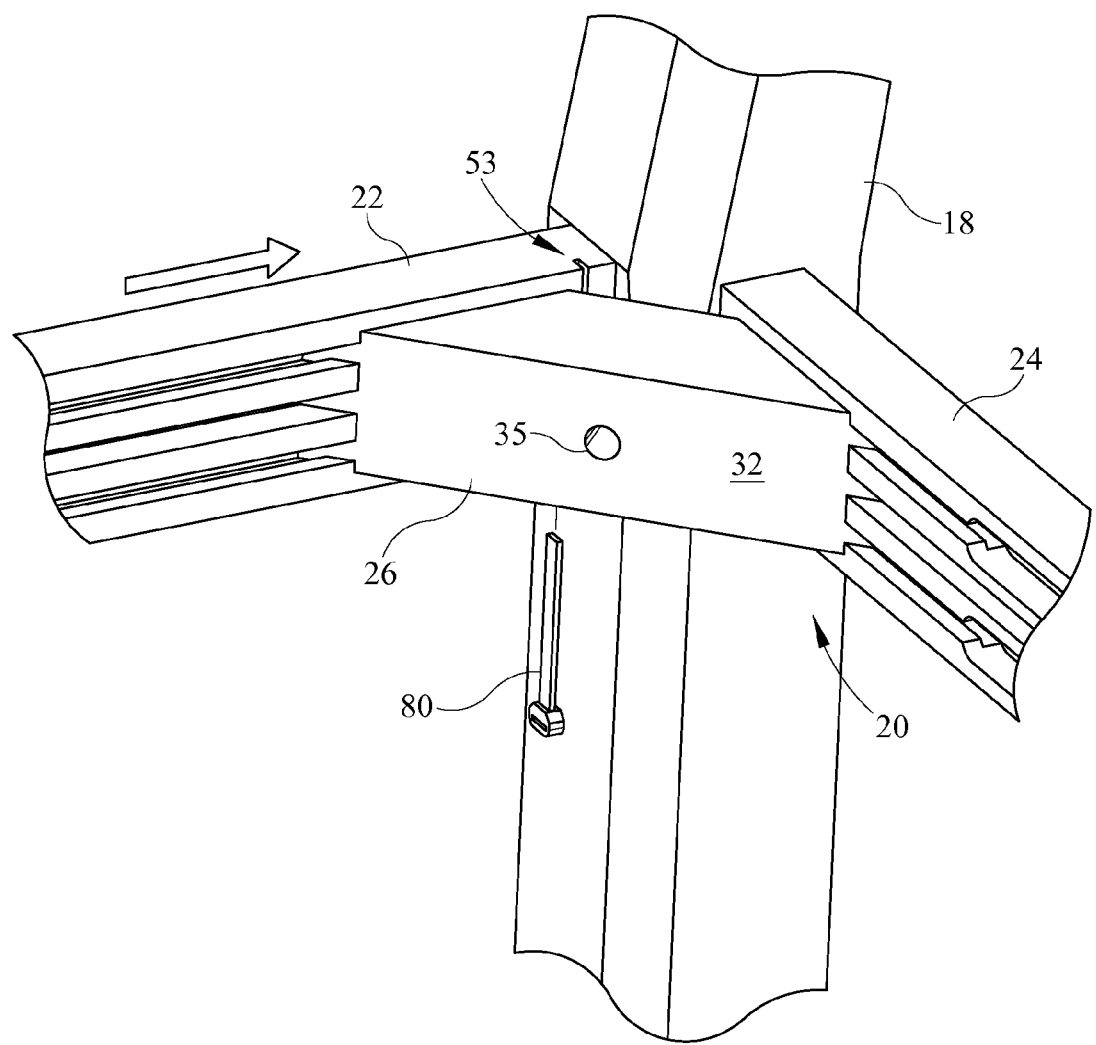
FIG. 9 depicts a perspective view of furniture joinery at one corner of a furniture piece.

Referring now to FIGS. 6 and 8, the slide rail 22 is shown in perspective view and in a side-sectional view, respectively. The slide rail 22, which is depicted in the front and sides of the chair 10 in FIG. 1, comprises grooves 60, 62, 64. As depicted, the upper and lower grooves 60, 64 are substantially T-shaped in cross-section while the middle groove 62 is not. The grooves 60, 62, 64 extend from a first end 50 to a second end 52 of the slide rail 22. The first end 50 and second end 52 also comprise keys 28 which engage keyways in adjacent furniture components, such as the exemplary chair legs and table legs. The keys 28 are generally shown as rectangular with rounded corners, however, the keys 28 may vary in shape and should correspond to allow fitting with the adjacent keyways. Accordingly, the slide block 26 may be connected to the slide rail 22 by engagement of the grooves 60, 62, 64 and slides 40, 42, 44 at either end 50, 52. With this configuration, the slide block 26 is captured in the slide rail 22 due to the corresponding shapes of the slides 40, 42, 44. As seen in FIG. 8, beneath the grooves 60, 64 are undercut rectangular channels 67, 69, respectively. The T-shaped slides 40, 44 (FIG. 5) are sized to fit with the grooves 60, 64. The channels 67, 69 receive the heads 43, 47 of the slide block 26. The heads 43, 47 are sized wider than the grooves 60, 64 so as to engage complimentary opposed flat surfaces between the undercut channels 67, 69 and the grooves 60, 64. Accordingly, the narrowed portions of the grooves 60, 64 capture the heads 43, 47 of the slides 40, 44, respectively and the slide blocks 26 may not be removed with a force perpendicular to the longitudinal axis of the rail 22. Instead, the block 26 must be slidably positioned at either end 50, 52 of the rail 22 for removal, or insertion. One skilled in the art should realize that the slide rail 22 may be utilized with a table, such as that shown in FIG. 2, by merely varying the length of the rail to compensate for a table.

The first end 50 and second end 52 of the slide rail 22 each comprise a slot 51, 53, respectively. As oriented in FIG. 6, the slots 51, 53 are vertically positioned and transverse to the grooves 60, 62, 64. The slots 51, 53 are sized to each receive a plastic insert against which the slide blocks 26 can engage to pull the slide rail 22 toward a leg 16,18 during construction as described further herein. The slots 51, 53 may extend through upper and lower surfaces of the rail 22 as depicted or may extend through at least a single surface allowing insertion though the slide rail 22. Alternatively, it is within the scope of the present invention that the slot be positioned across the grooves 60, 62, 64 but not extending through the upper or lower surfaces of the rail 22. When an insert 80 (FIG. 3) is engaged by the slide block 26, the rail 22 is pulled toward the adjacent furniture component to which the slide block 26 is being tightened. The inserts 80 may be formed of various materials but the exemplary embodiment utilizes a plastic material, so that if the parts are over-tightened, as described further herein, the plastic will absorb some of that force. This structure also increases the rigidity of the furniture piece, for example chair 10.

Figure 7:
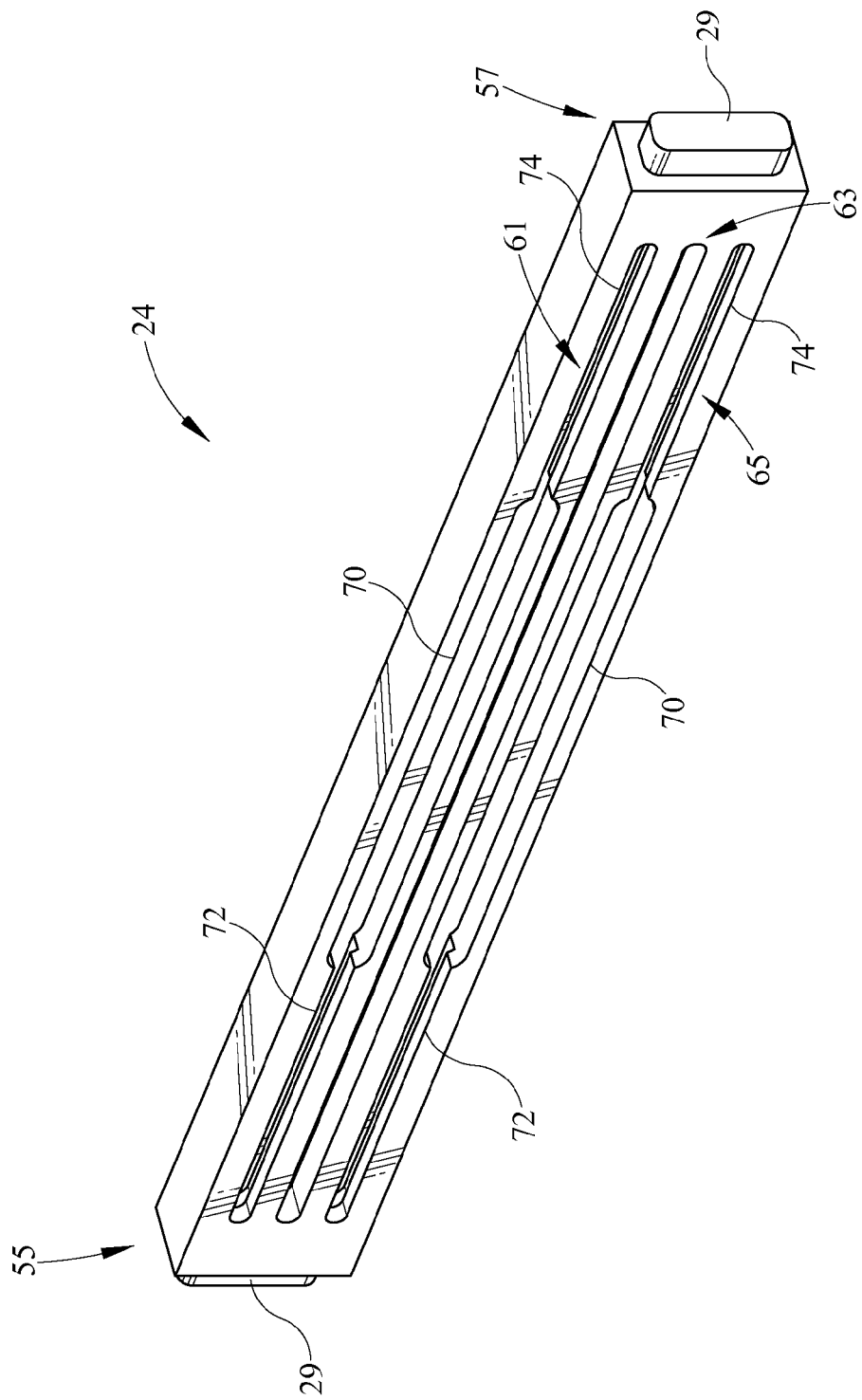
FIG. 7 depicts a perspective view of an alternative slide rail.

Referring now to FIG. 7, an alternative slide rail 24 is depicted in perspective view. One skilled in the art should understand that the rear slide rail 24 may also be utilized in the table of FIG. 2 except that the rail 24 may need to be lengthened to accommodate the table dimensions. It should be understood that the slide rail 22 may be substituted for the rear slide rail 24, and vice-versa, if so desired according to an alternative embodiment. Like the slide rail 22, the rear slide rail 24 is generally rectangular in shape having a first end 55 and a second end 57. In addition to the cross-sectional shape, the rails 22, 24 may have some curvature rather than being completely straight, as depicted. Each of the first and second ends 55, 57 comprise keys 29 which may vary in shape, as previously described. The keys 29 mate with keyways 27 in the rear legs 18. Extending longitudinally between the first and second ends 55, 57 are a plurality of grooves 61, 63, 65 corresponding to slides 40, 42, 44, respectively. Unlike rail 22, the grooves 61, 63, 65 do not extend through the ends of the rail 24. Therefore the slide block 26 cannot be slidably positioned from the ends 55, 57 of the slide rail 24. The upper and lower grooves 61, 65 comprise a widened central portion 70 and narrow distal ends 72, 74. The central portion 70 has a vertical dimension which is greater than or equal to the vertical thickness of the upper and lower heads 43, 47. This widened portion 70 is dimensioned to received the slides 40, 44 of slide block 26 so that the slide blocks 26 and rail 24 can be engaged. Within the narrow distal ends 72, 74 of the rail 24, the cross-section of the rail 24 is generally similar to rail 22. As the slide blocks 26 are moved longitudinally relative to the slide rail 24, the heads 43, 47 move into the narrow portions 72, 74 of the channels 60, 64. The narrow portions 72, 74 are sized to be more narrow than the heads 43, 47 but wide enough to receive the necks 41, 45. Accordingly, the slide blocks 26 are captured within these channels 60, 64 and cannot be removed from the slide rail 22 unless the slide block 26 is moved into the central portion 70 of the channels 60, 64 for removal. Like the slide rail 22, when the slide block 26 is positioned into the slide rail 24, the central slide 42 is located in the central groove or channel 62 for longitudinal movement therein.

Figure 14:
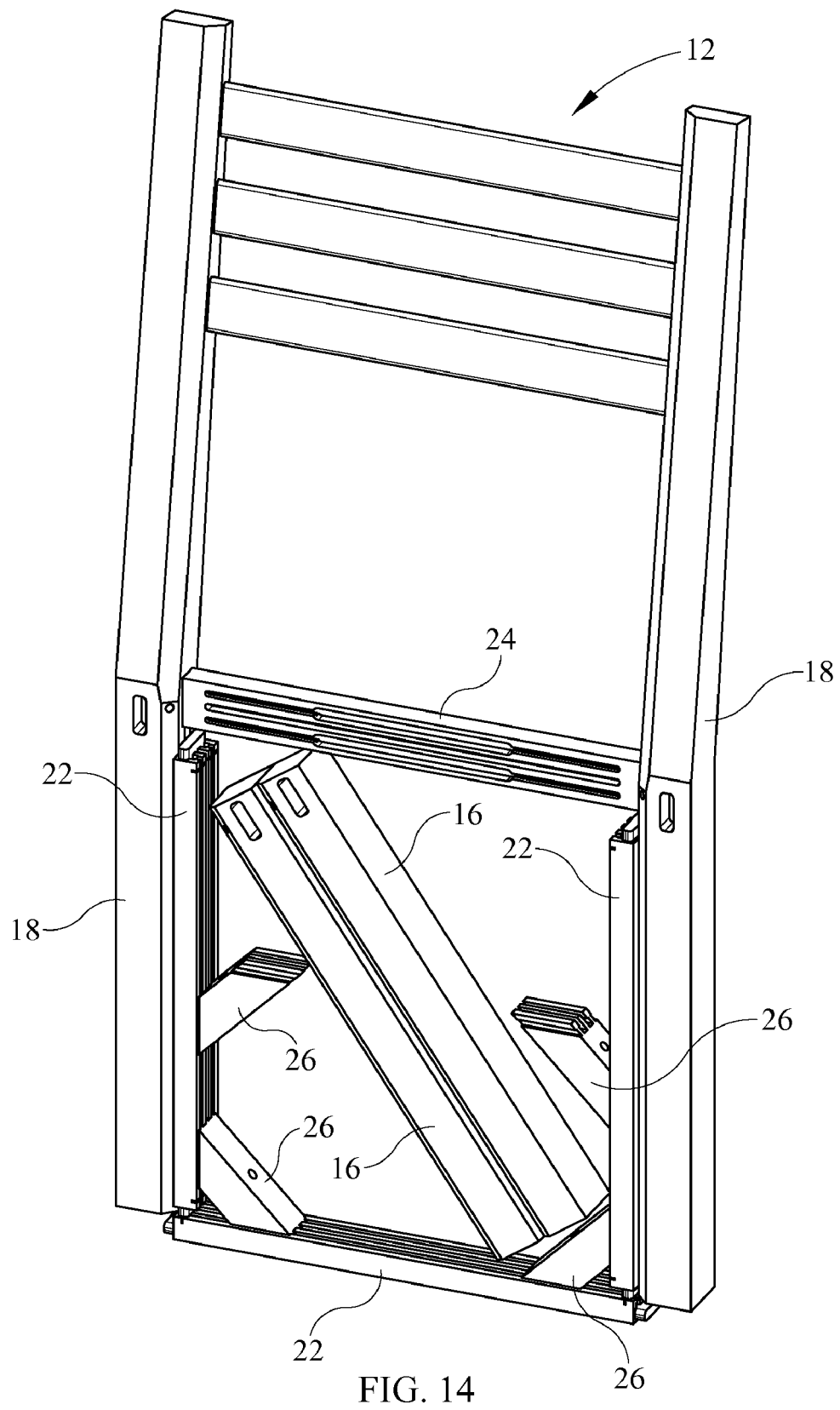
FIG. 14 depicts a perspective view of the furniture joinery partially assembled and arranged for shipping.

It should be understood that the above described structure of rear legs 18 and seat back 12 may be manufactured and sent to an assembly location in an already constructed condition. Some of the elements of the chair 10 may be partially assembled and located in a nested configuration between the legs 18. This minimizes volume involved in shipping. For example, as depicted in FIG. 14, a nested configuration is shown in perspective view to provide a low profile arrangement for shipping. The rear leg 18 are shown connected by the chair back 12 and the rear slide rail 24. Positioned parallel to the rear legs 18 are slide rails 22. One additional slide rail 22 is positioned at the bottom ends of the rear legs 18 extending from one leg 18 toward the opposite leg 18. Each of the parallel slide rails 22 is oriented with the grooves facing inwardly. Likewise, the lower slide rail 22 is also oriented with the grooves facing inwardly. In this configuration, the slide blocks 26 may be used to hold the rails 22 together. As shown, the two lower slide blocks 26 connect the three slide rails 22. The front legs 16 may also be positioned between the rear legs 18 diagonally therebetween. One skilled in the art can see that the partially assembled components of FIG. 14 can be placed in a box having a height dimension generally which is equal to the thickness of the rails 22 and legs 18. Therefore less volume is necessary of the packaging which decreases shipping costs.

Figure 10:
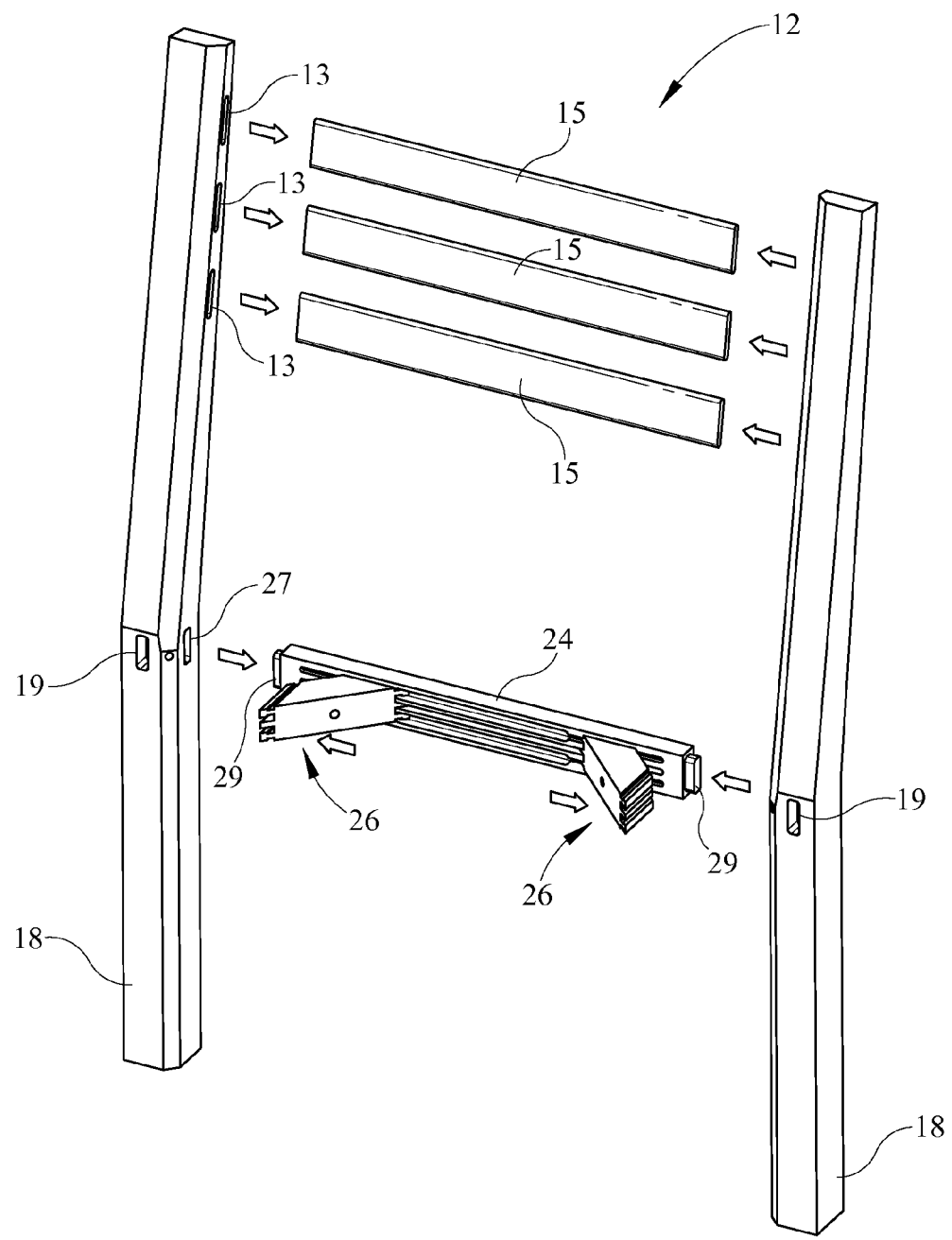
FIGS. 10-13 depict perspective sequence views of the construction of the exemplary chair of FIG. 1.

Referring now to FIGS. 9-13, the construction of the joinery 20 is described. Initially, the slide block 26 is connected to the slide rail by inserting the slide block 26 into the grooves 60, 62, 64 at the widened central portion 70 of the slide rail 24. Referring now to FIG. 10 a perspective view of an unassembled chair 10 is shown. The slide blocks 26 are positioned within the central portion of the grooves of the slide rail 24 and arrows indicate their sliding motion outwardly towards the ends of the rail 24. The rear legs 18 are depicted opposing one another for construction of the chair back 12. The slats 15 are disposed between the opposed apertures 13 and the rear legs are moved together to capture the slats therein. One skilled in the art will realize that wood glue or other known fixatives may be utilized to retain the slats 15 between the rear legs 18 during construction. In addition, the rear slide rail 24 is disposed between opposed keyways 27. The slide rail 24 is positioned at a level equal to the keyways 27, the rear legs are moved together so that the seatback 12 is formed and so that the keys 29 are received by the keyways 27 of the rear legs 18.

Figure 11:
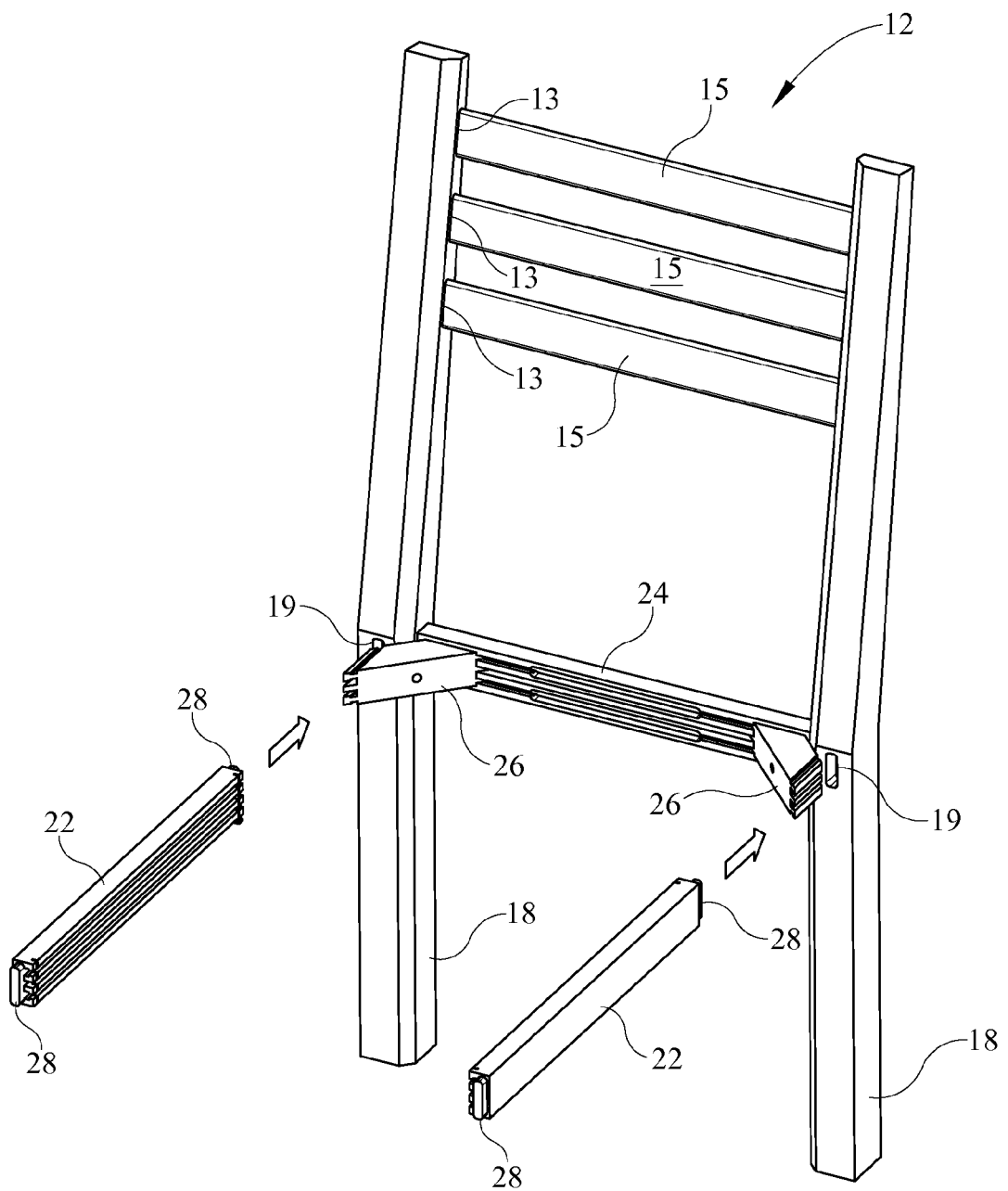

Referring now to FIG. 11, the slide rails 22 are shown moving into position with the rear legs 18 so that the keys 28 will engage the keyways 19. In moving the slide rail 28 toward the rear leg 18, the importance of the slide rail having the grooves cut from end to end is illustrated. In this construction, the slide rails 22 may engage the slide block 26 as the slide rail 22 moves into engagement with the rear legs 18.

Figure 12:
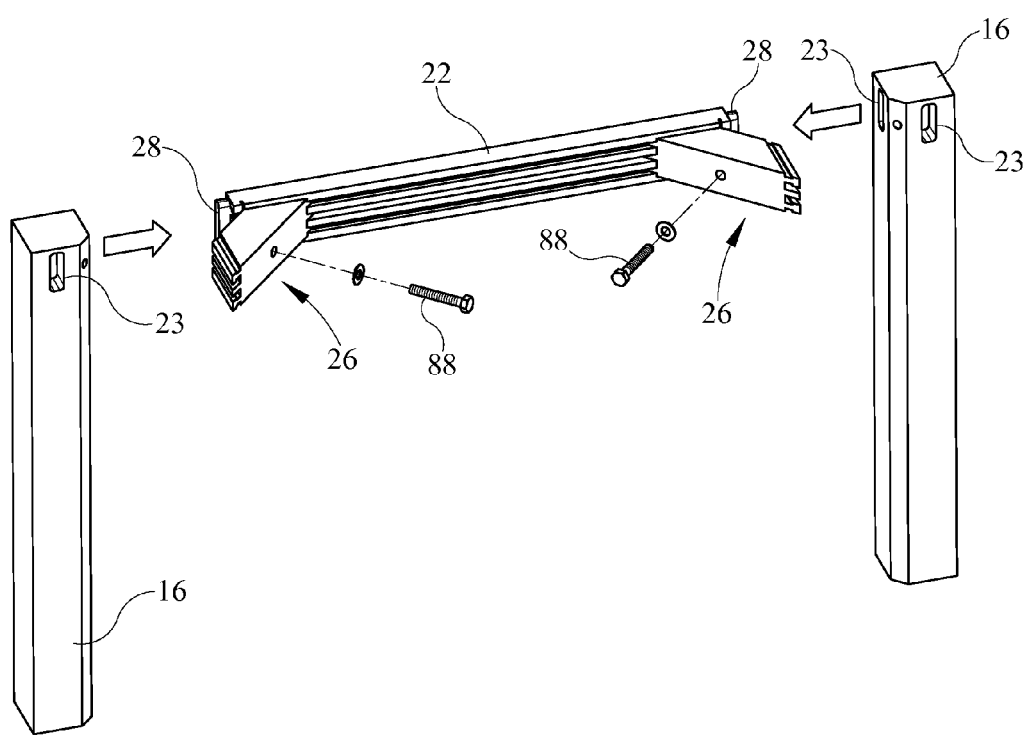

Referring to FIG. 12 the front legs 16 and the slide rail 22 are depicted. The legs 16 are moved toward the front slide rail 22 so that the keyways 23 engage the keys 28 disposed at the ends of the slide rail 22. The slide blocks 26 are shown engaging the slide rail 22 prior to engagement of the slide rail 22 with the legs 16. The slide blocks 26 are moved toward the ends of the rail 22 adjacent the legs 16 for assembly with the remaining chair assembly. This subassembly may be loosely assembled and held together with wood glue for attachment to the remainder of the chair 10 assembly. The assembly should be completed as described further herein before the glue hardens.

Figure 13:
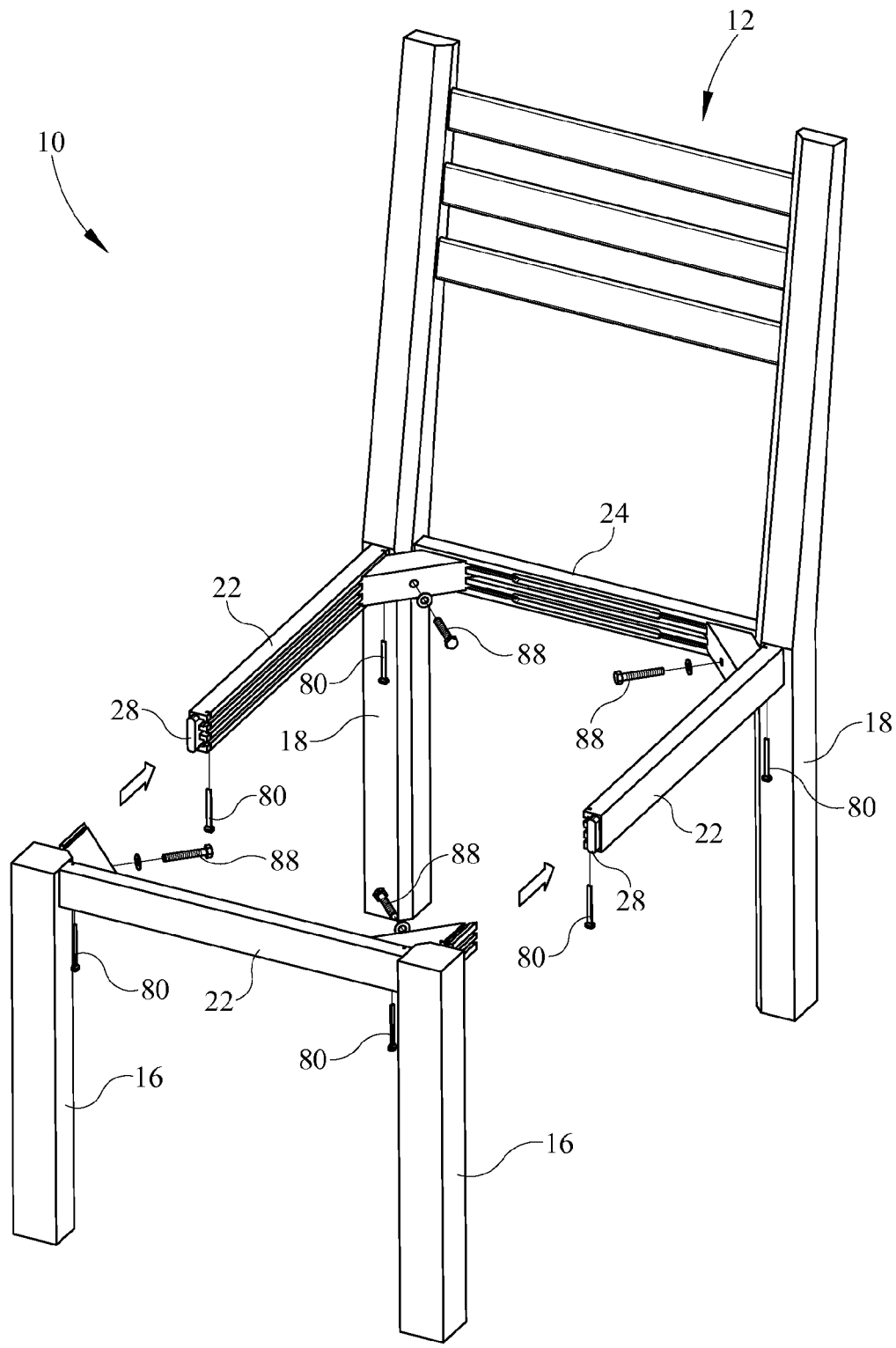

Referring now to FIG. 13, the front legs 16 and front slide rail 22 are shown assembled and arrows indicate movement of that subassembly toward the side slide rails 22. The front slide blocks 26 are positioned outwardly towards the front legs 16 for engagement with the slide rails 22 as the assemblies are moved together. The keys 28 at the ends of the slide rails 22 will engage the keyways 23 of the front legs 16. After the assembly is put together, inserts 80 are positioned within the side slide rails 22 through slots 51, 53. FIG. 13 also depicts the inserts 80 being moved into position within the slide rail 22. Specifically the inserts 80 may be formed of a piece of plastic or other material and are inserted through the slots 51, 53 (FIG. 6) of the slide rail 22. Once the inserts 80 are positioned at the rear legs 18 and front legs 16 within the side slide rails 22, fasteners 88 are inserted through apertures 35 of the slide blocks 26. As the fasteners 88 are tightened into the front legs 16 and rear legs 18, the slides of the blocks 26 will engage the inserts 80 near the corners of the chair 10. Such engagement in combination with the fasteners 88 being tightened pulls the legs 16, 18 and the corner joineries 20 together to tighten the structure.

Figure 15:
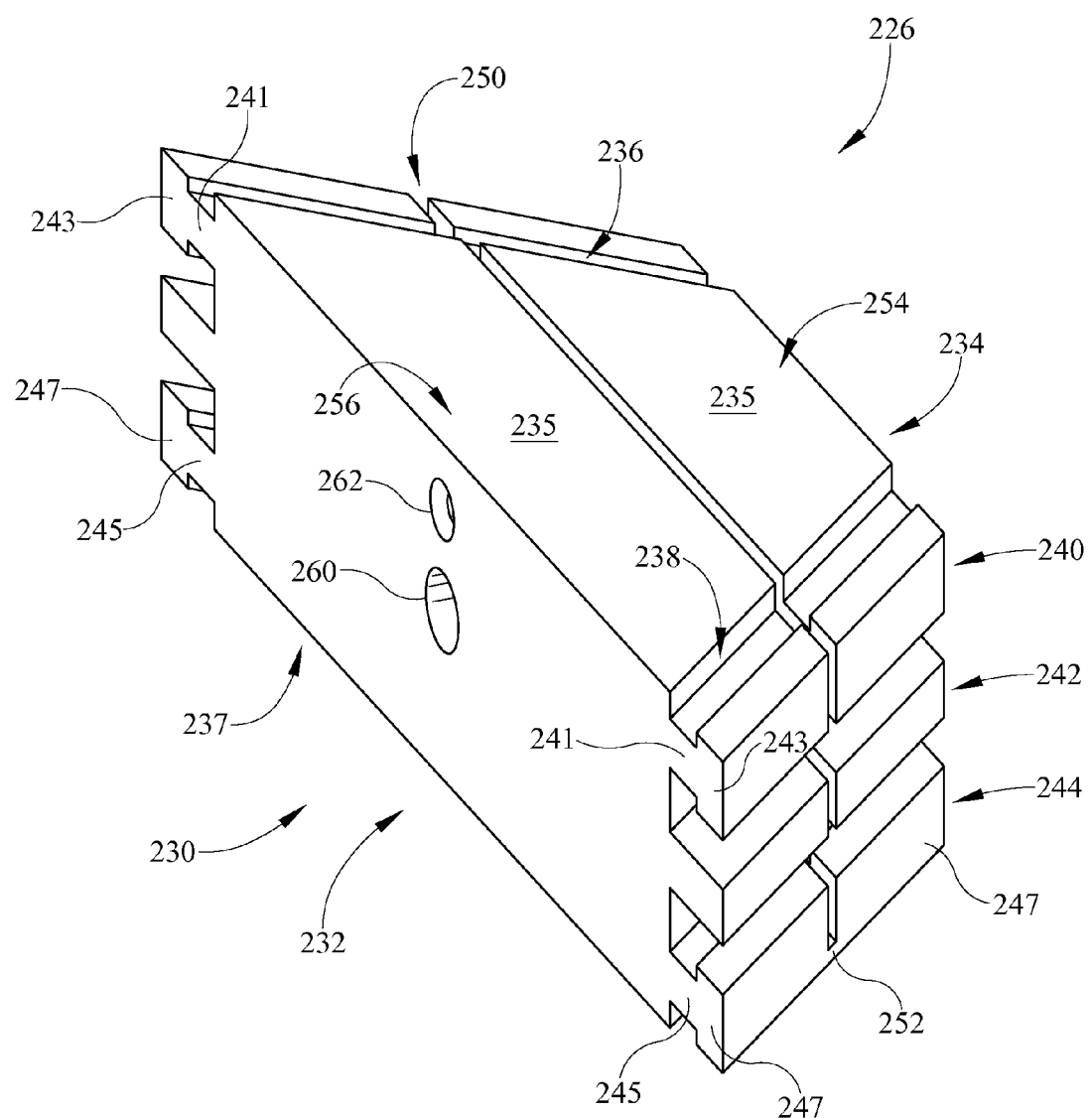
FIG. 15 depicts a perspective view of an alternative embodiment of a slide block.

Referring now to FIG. 15, a perspective view of a slide block 226 is depicted. The slide block 226 is defined by a generally trapezoidal shaped body 230 having a first front short surface 234 and a second rear long surface 232. The short surface 234 and the long surface 232 are substantially parallel surfaces. Extending between the rear and front surfaces 232, 234 are angled side surfaces 236, 238. The front surface 234 rear surface 232 and side surfaces 236,238 define the trapezoidal shaped body of the slide block 226. The slide block 226 also comprises an upper surface 235 and a lower surface 237 which complete the surfaces of the body 230.

Figure 21:
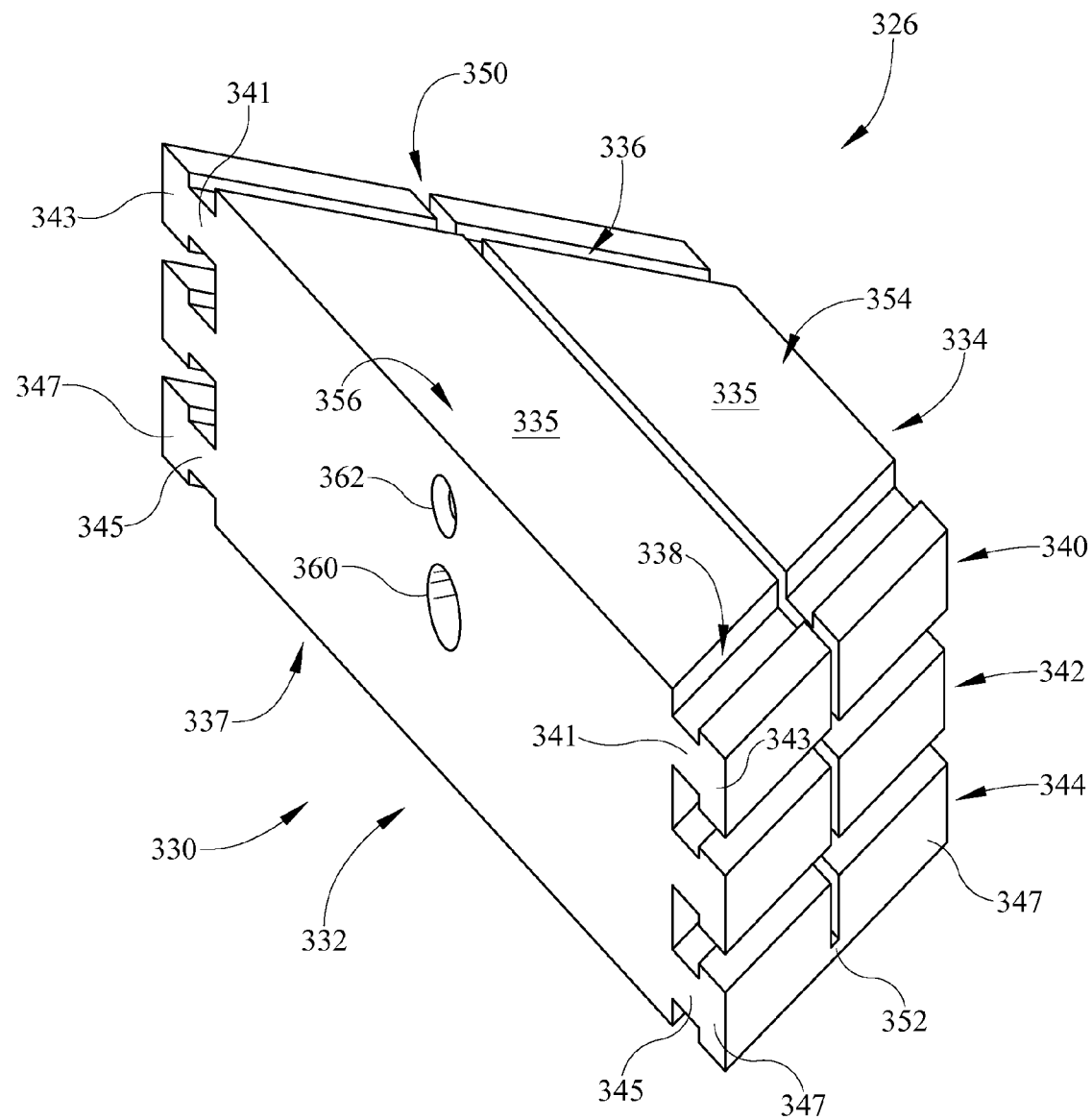
FIG. 21 depicts a perspective view of the slide block of FIG. 15 with slides all having a T-shaped cross-section.

Extending from the nonparallel sides 236, 238 are a plurality of slides including an upper slide 240, a middle slide 242 and a lower slide 244. Each of the upper and lower slides 240, 244 has a substantially T-shaped cross-section comprising a neck 241 and a head 243. Likewise, the lower slide 244 comprises a neck 245 and a lower head 247. The middle slide 242 fails to comprise any head as described with the upper and lower slides 240, 244. Many variations, orientations and arrangements of heads and necks may be utilized and therefore the exemplary embodiment should not be considered limiting. For example, as shown in FIG. 21, a block 326 may have a plurality of slides 340, 342, 344 each having a T-shaped cross-section. Or as a further alternative, an alternate cross-sectional shapes may be utilized. According to the instant exemplary embodiment, the sides 236, 238 are angled relative to the long side 232 by an angle of about 45 degrees. However, these angles may vary depending on the components being joined and should not be considered limiting but instead are provided merely for illustration purposes.

Extending through the upper surface 235 toward the lower surface 237 is a cut 250. At a bottom of the cut 250, toward the lower surface 237, the body 230 remains joined and the joined material defines a pivot 252. The cut 250 extends from the first side 236 to the second side 238 and downwardly through the body 230 of the slide block 236. This cut 250 defines a first portion 254 and a second portion 256 wherein the first portion is located toward the front short surface 234 and the second portion 256 is located toward the rear long surface 232. This description should not be considered limiting as the first portion may alternatively be the rear portion and the second portion may alternatively be the front portion of the block 226. The cut 250 is substantially vertically oriented but may alternatively be disposed at an angle to the vertical. Additionally, the cut 250 is shown to extend from the upper surface toward the bottom surface 237. In the alternative, the cut 250 may extend from the bottom surface up toward the top surface 235 in a fashion opposite that depicted in FIG. 15, and so that the pivot is located near the upper surface 235 of the block rather than the bottom surface 237 as shown.

Figure 16:
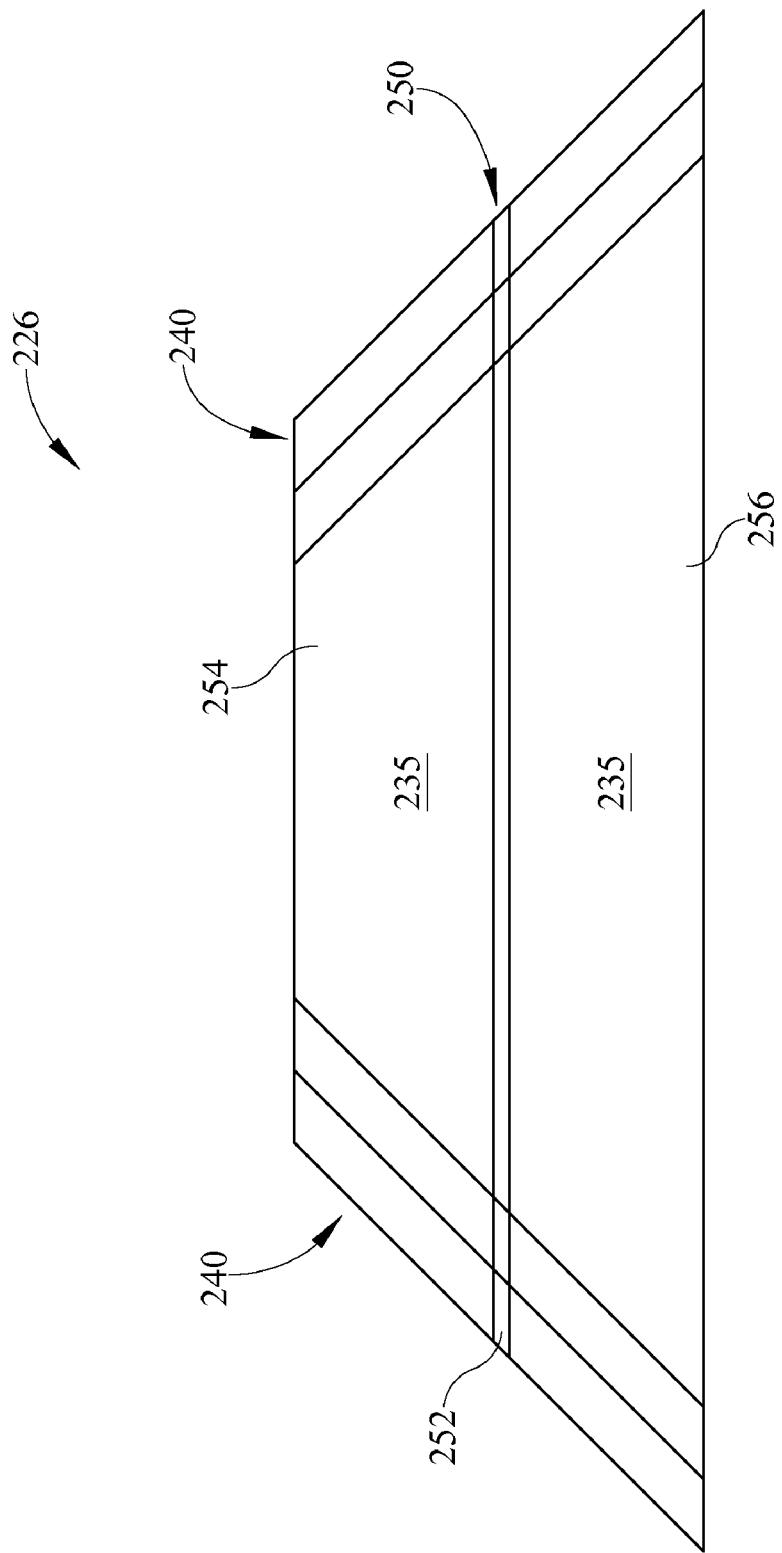
FIG. 16 depicts a top view of the alternative slide block of FIG. 15.

Referring now to FIG. 16, a top view of the slide block 226 is depicted. In this view, the cut 250 is clearly shown extending through the body 230 of the block 226. In the view depicted, the cut 250 is shown spaced apart. However, when compressive forces are placed on the first portion 254 and the second portion 256, the first and second portions 254, 256 move toward one another by pivoting at the pivot 252. As shown in this view, the slides 240 are aligned when cut 250 is spaced apart in its relaxed position.

Figure 17:
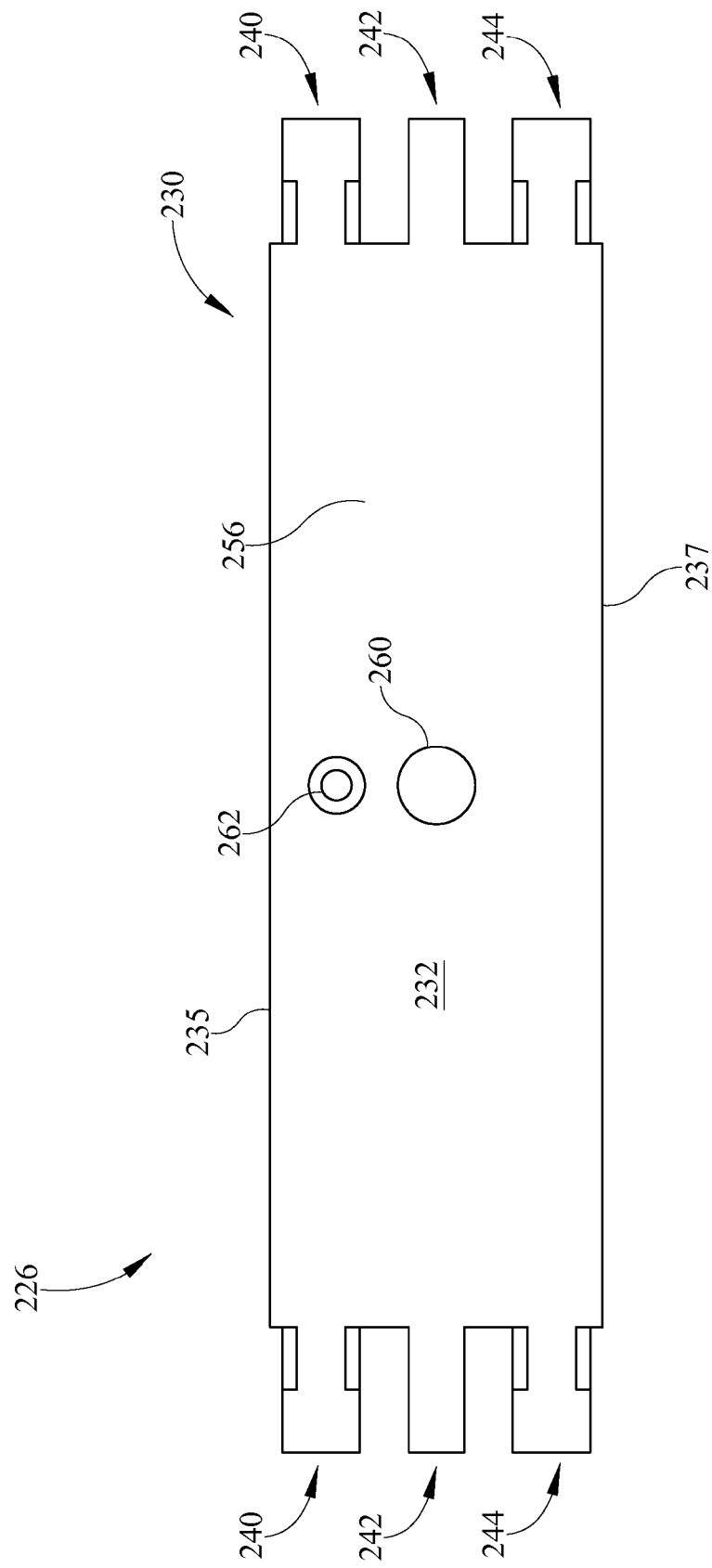
FIG. 17 depicts a rear view of the alternative slide block of FIG. 15.

Referring now to FIG. 17, a rear view of the slide block 226 is depicted. The rear surface 232 includes at least one fastening aperture 260. According to the exemplary embodiment, the device utilizes a first fastening aperture 260 which connects to an adjacent furniture joinery element such as a leg or frame member. A second fastening aperture 262 is positioned away from the lower pivot 252 (FIG. 15) in order to draw the first and second portions 254, 256 toward one another as will be further described. In the alternative, if the block utilizes a pivot 252 (FIG. 15) which is disposed near the top surface 235 of the block rather than the bottom surface 237, the fastening aperture 262 may be located near the bottom surface 232 which increases the torque applied by the fastener to create pivot applied by the block 226. The fasteners utilized with the instant embodiment may vary in type and may have, for example, coarse threads such as wood screws or alternatively may have fine threads where an insert is positioned in the front portion.

Figure 18:
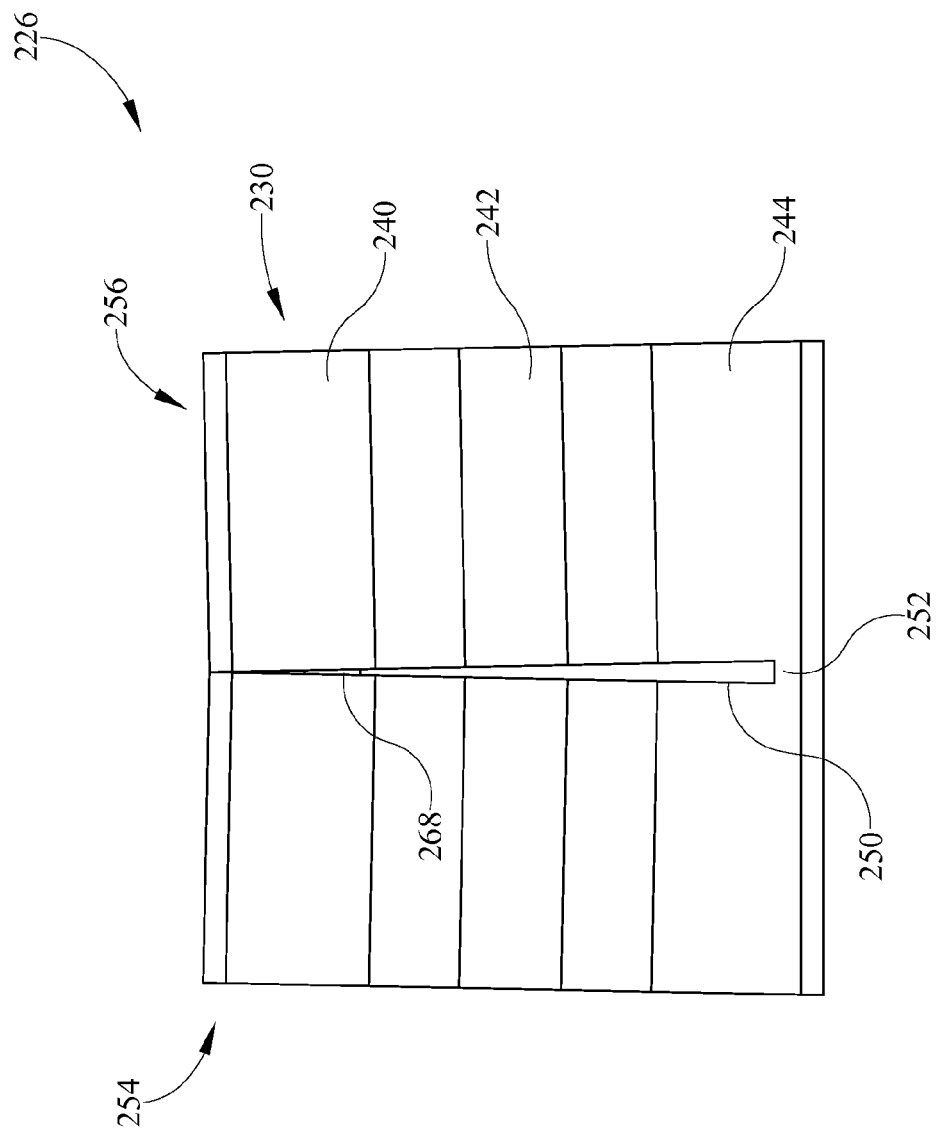
FIG. 18 depicts a side view of the slide block of FIG. 15 in a pivoted configuration.

Referring now to FIG. 18, a side view of the block 226 is shown in a compressed position due to a fastener extending through the body 130 of the slide block 226. The slide block 226 is shown compressed due to a fastener 268 extending through the block from a rear surface 232 towards a front surface 234 of the body 230. The cut 250 is shown in a generally triangular shape rather than the open-top U-shaped relaxed orientation depicted previously. This change in shape of the cut 250 is due to pivoting occurring at the pivot 252 and compression of the first portion 254 with the second portion 256. Thus, the upper portions of the body 230 are compressed closer than the spacing at the bottom portion of the block body 230. Additionally, as shown in this figure, the slides 240, 242, 244 are misaligned from one another as between the first and second portions 254, 256.

Figure 19:
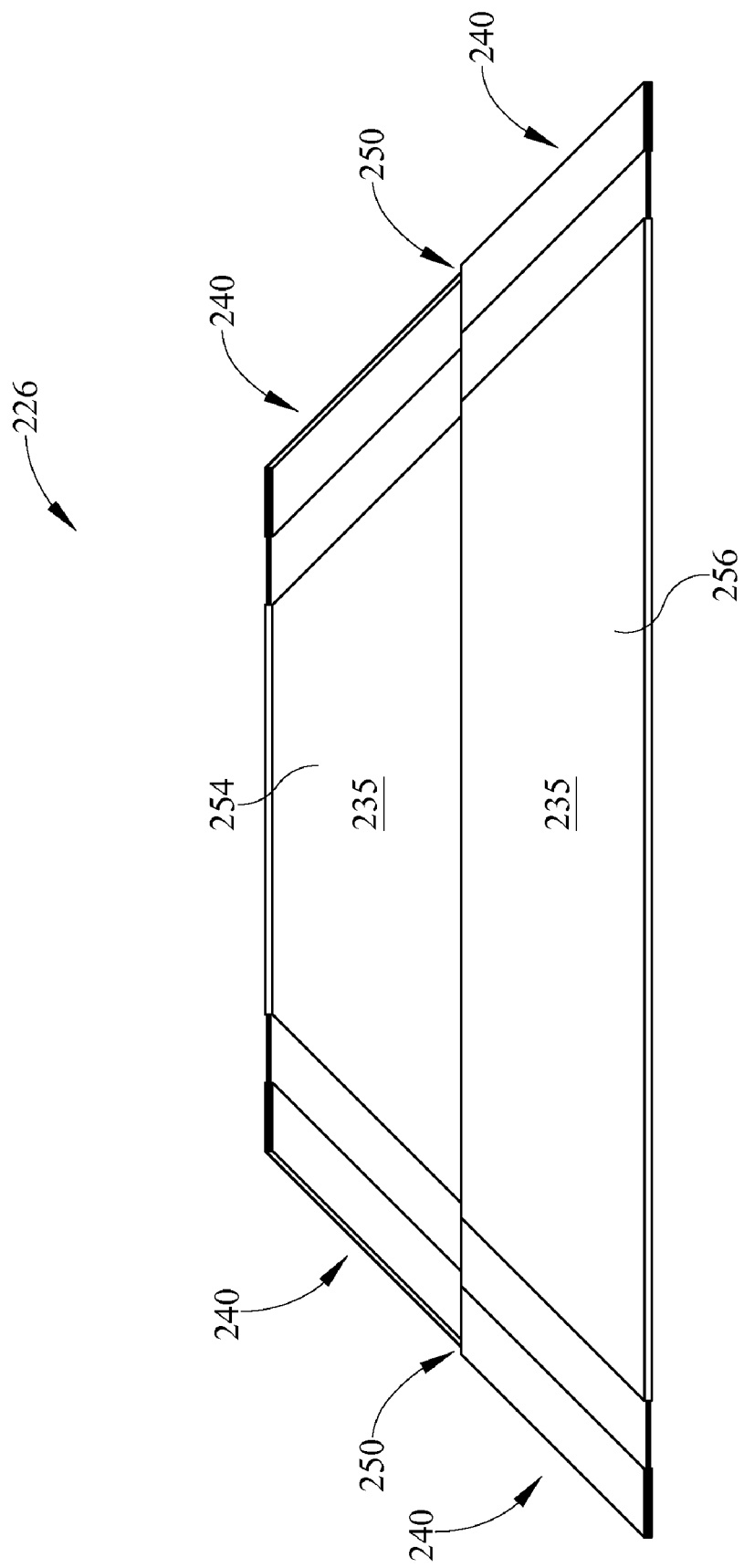
FIG. 19 depicts a top view of the slide block of FIG. 15 in a pivoted configuration.

Referring now to FIG. 19, the slide block 226 is again shown in top view in the compressed position. In the compressed position of FIG. 19, the slides 240 are depicted in a misaligned position and the cut 250 is generally not seen due to the compression of the first and second portions 254, 256. Due to the misalignment of slides 240, 242, 244, the slide block 226 creates an increased frictional engagement with a slide rail, for example slide rail 22 (FIG. 20), so that the block 226 binds in the slide rail and therefore may not be slidably removed. In FIG. 19, the cut 250 is also shown compressed at the top of the body 230 (FIG. 15) such that the first portion and second portion 254, 256 are compressed together resulting in the misalignment of slides 240.

Figure 20:
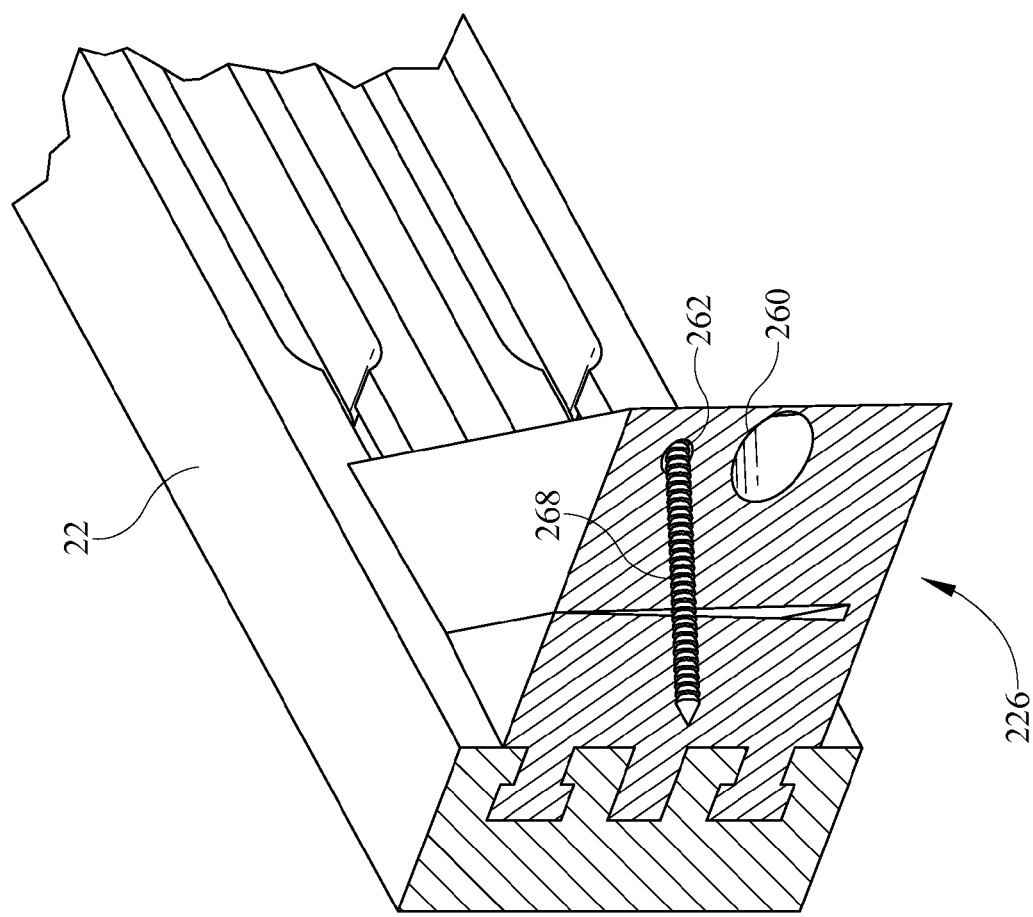
FIG. 20 depicts a sectional view of a slide block disposed in a slide rail.

Referring now to FIG. 20, a sectioned perspective view of the slide block 226 is depicted within an exemplary slide rail 22. The slide block 226 is compressed due to fastening of a fastener 268 through the aperture 262. Due to the misalignment of the slides 240, 242, 244 (FIG. 15), the block 226 is frictionally engaged in the rail 22 such that the block cannot be removed without removal of the fastener 268 therefrom.

Referring again to FIG. 21, one skilled in the art will recognize that the slide block 326 has been altered to have a T-shaped middle slide 342. The middle slide 342 is formed by a neck and head as in previous embodiments so one will realize that the slides may all have the same cross-sectional shape or may have varying cross-sections. A rail used with slide block 326 will need modification to accept the T-shaped middle slide 342.

Figure 22:
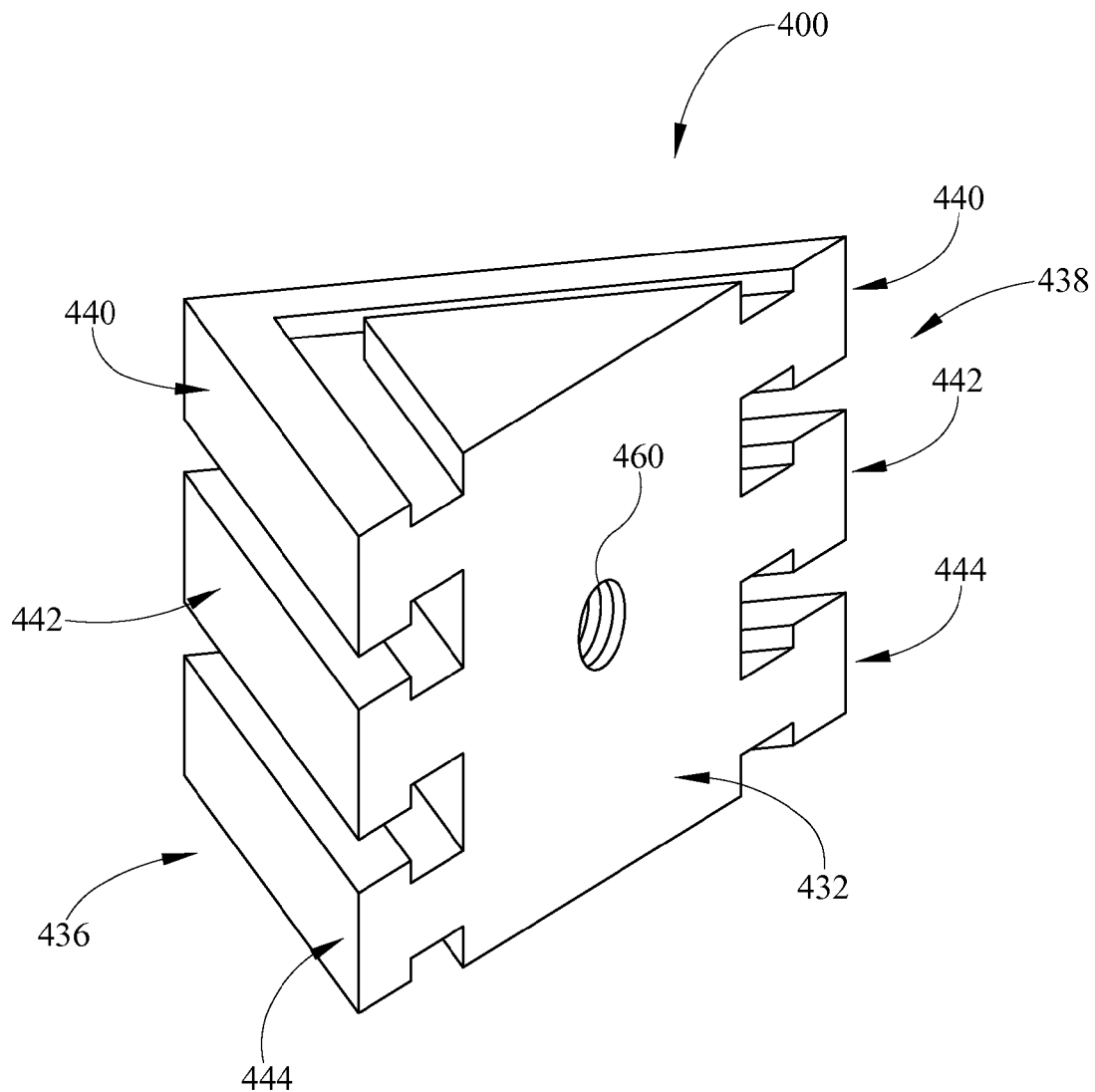
FIG. 22 depicts a perspective view of a corner element for use with a slide block.
Figure 23:
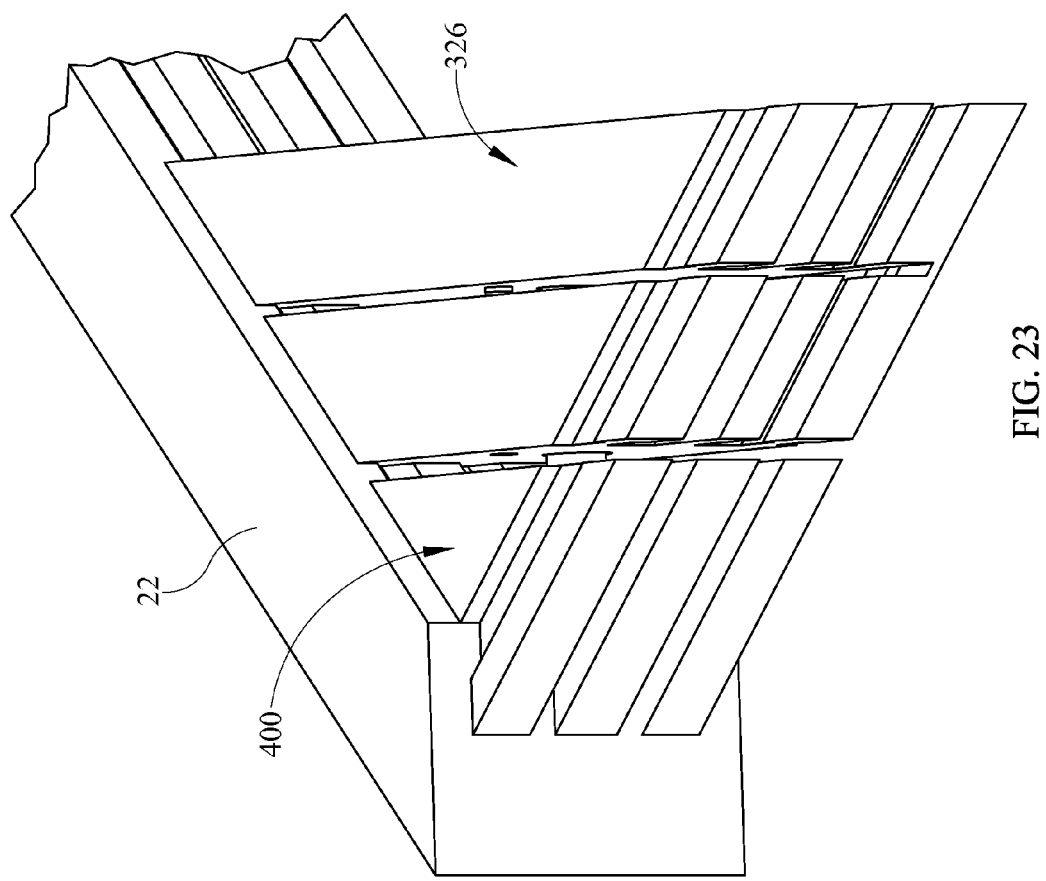
FIG. 23 depicts a sectioned perspective view of the corner element and a slide block disposed in an exemplary slide rail.

Referring now to FIGS. 22 and 23, a triangular corner element 400 is depicted in perspective view. The corner element 400 allows for use of the slide blocks in a corner where two slide rails 22 are directly abutting one another, rather than meeting at a third furniture joinery element such as a table leg or chair leg.

The corner element 400 includes a body having a rear surface 432 and first and second angled side surfaces 436, 438 which, in combination, define a triangular shape. Each of the angled sides 436, 438 have a plurality of slides 440, 442, 444. As previously described, the slides may have various cross-sectional shapes. For example, the upper and lower slides 440, 444 may have T-shaped cross sections, or alternatively, the all three slides may have T-shaped cross sections, all defined by a head portion and a neck portion. Additionally, alternate shapes may be utilized such as L-shaped cross-sections or other such requiring an undercut groove in the slide rails 22.

The corner element is positioned in the inside corner of the two adjacent slide rails 22 and the slide block, for example, 326. The slides 440, 442, 444 are all slidably disposed within the grooves of a rail, for example rail 22. The corner element 400 slides into a corner and next a slide block, such as slide block 326, may be utilized. With the slide block 326 positioned adjacent the corner element 400, a fastener may extend through aperture 360 and into the corner element 400 connecting these elements. Additionally, a fastener may extend through aperture 362 to pivot or deform the slide block and inhibit removal of the slide block 326 as previously discussed or the removal of the corner element.

In operation, a corner element 400 may or may not be utilized depending on the type of corner assembly being formed. A slide block 326 is positioned in a rail 22 or other furniture member having a plurality of grooves. The slide block 326 is positioned adjacent to a furniture joinery or member such as a table or chair leg. The slide block 326 may additionally be engaging a second adjacent rail 22. When a corner is constructed, fasteners are positioned in either or both of the apertures 360, 362. The former aperture may be used to connect the block 326 to the, for example, leg and the latter aperture may be used to cause pivoting at pivot 352 and misalignment of slides 340, 342, 344. The misalignment of the slides 340, 342, 344 inhibits movement of the block 326 with the rail 22 thus locking the furniture joinery together. It should be understood that the slide block 326 may be substituted with any of the other blocks described herein so long as the slide rail has grooves which correspond to the cross-sectional shape of the slides.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A furniture joinery, comprising:
   a slide rail having a longitudinal axis and a plurality of grooves extending substantially parallel to said longitudinal axis;
   at least one substantially trapezoidal-shaped slide block having a short surface and a long surface parallel to said short surface, said slide block slidably disposed in said slide rail for movement substantially along said longitudinal axis;
   said slide block having a plurality of slides engaging said plurality of grooves of said slide rail, at least one of said plurality of slides having a substantially T-shaped cross-section, said slides having a leading surface extending from said short surface at an angle to said longitudinal axis; and, said substantially T-shaped cross-section having a neck and a head, said grooves receiving said neck therein and said head inhibiting removal of said slide block by a force perpendicular to a slide motion along said slide rail;

at least one fastener aperture passing through said slide block from said long surface toward said short surface;

said slide block having a cut extending into said slide block, said cut partially separating a first portion of said block from a second portion, said cut passing through said at least one fastener aperture;

at least one fastener passing from said first portion to and engaging with said second portion and wherein actuation of said at least one fastener causes pivoting at a closed end of said cut and frictional engagement of said slides with said grooves of said slide rail.

2. The furniture joinery of claim 1, said fastener having a first position and a second position wherein at one of said first and second positions said fastener engages said first portion and said second portion.

3. The furniture joinery of claim 2, said slides being misaligned in one of said first position and second position relative to said longitudinal axis.

4. The furniture joinery of claim 1, said cut extending between an upper surface of said slide block and a lower surface of said slide block.

5. The furniture joinery of claim 4, said cut being substantially vertical.

6. The furniture joinery of claim 4, said cut being angled.

7. The furniture joinery of claim 1, said cut extending between a lower surface of said slide block and an upper surface of said slide block.

8. The furniture joinery of claim 1 wherein said fastener displaces said slides on at least one side of said cut.

9. A furniture joinery, comprising:

a slide block having a substantially trapezoidal shape including an upper surface, a lower surface, a short side and a long side each extending between said upper and lower surfaces, said short side and said long side being substantially parallel, and two angled side surfaces extending between said short side and said long side;

at least one slide disposed along each of said side surfaces;

at least one cut passing partially through said slide block and defining a first portion of said slide block, a second portion of said slide block and a pivot, said at least one cut passing through said at least one slide;

a fastener extending through one of said first portion and said second portion of said slide block across said at least one cut to the other of said first portion and said second portion of said slide block, wherein rotation of said fastener causes pivoting of one of said first and second portions of said slide block;

said slides having a first aligned position and a second misaligned position, said misaligned position caused by said extending of said fastener through said one of said first portion and said second portion of said slide block to the other of said first portion and said second portion of said slide block.

10. The furniture joinery of claim 9, said slide block having a fastener aperture on said long side.

11. The furniture joinery of claim 10, said fastener aperture extending through said first and second portions of said slide block.

12. The furniture joinery of claim 9, said at least one cut being substantially vertically oriented.

13. The furniture joinery of claim 9, said at least one cut being at an angle to a vertical axis.

14. The furniture joinery of claim 9, said at least one cut extending from said upper surface toward said lower surface.

15. The furniture joinery of claim 9, said at least one cut extending from said lower surface toward said upper surface.

16. A furniture joinery, comprising:

a slide block having a first angled side surface and a second angled side surface, a top surface and a bottom surface extending between said first and second angled sides, and a plurality of slides extending along said first and second angled side surfaces;

a cut extending partially through said slide block and defining a first portion and a second portion, a material of said slide block adjacent said cut defining a pivot;

a fastener aperture extending through said slide block and from said first portion to said second portion, said cut intersecting said fastener aperture;

a fastener extending through said fastener aperture and engaging said first portion and said second portion, wherein movement of said fastener causes pivoting at said pivot and further causes misalignment of said plurality of slides between said first portion and said second portion of said slide block.

17. The furniture joinery of claim 16 further comprising a corner element being disposed between said slide block and a plurality of rails.

18. The furniture joinery of claim 17, said slides having a cross-sectional shape requiring an undercut groove on an adjacent rail.

19. The furniture joinery of claim 16, said corner element further comprising a plurality of slides on a first angled surface and a second angled surface.

* * * * *